United States Patent
Gschwind et al.

(10) Patent No.: US 9,563,534 B1
(45) Date of Patent: *Feb. 7, 2017

(54) DEBUGGER DISPLAY OF VECTOR REGISTER CONTENTS AFTER COMPILER OPTIMIZATIONS FOR VECTOR INSTRUCTIONS

(71) Applicant: International Business Machines Corporation, Armonk, NY (US)

(72) Inventors: Michael Karl Gschwind, Chappaqua, NY (US); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,652

(22) Filed: Sep. 10, 2015

Related U.S. Application Data

(63) Continuation of application No. 14/845,967, filed on Sep. 4, 2015.

(51) Int. Cl.
*G06F 11/36* (2006.01)

(52) U.S. Cl.
CPC ............. *G06F 11/36* (2013.01); *G06F 11/362* (2013.01); *G06F 11/3624* (2013.01)

(58) Field of Classification Search
CPC ................ G06F 11/36–11/366; G06F 11/3624
See application file for complete search history.

(56) References Cited

U.S. PATENT DOCUMENTS 5,560,009 A * 9/1996 Lenkov ............... G06F 11/3624
  714/E11.209
5,721,924 A * 2/1998 Kitadate ............. G06F 11/3624
  714/E11.209

(Continued)

FOREIGN PATENT DOCUMENTS

| GB | 002409067 B | 12/2006 |
| WO | 2007103195 A2 | 9/2007 |
| WO | 2010029794 A1 | 3/2010 |

OTHER PUBLICATIONS

Burger, Doug, and Todd M. Austin., The SimpleScalar tool set, version 2.0., [Online] 1997, ACM SIGARCH Computer Architecture News 25.3 (1997), [Retrieved from the Internet] <http://dx.doi.org/10.1145/268806.268810> pp. 13-25.*

(Continued)

*Primary Examiner* — Thuy Dao
*Assistant Examiner* — Ravi K Sinha
(74) *Attorney, Agent, or Firm* — Martin & Associates, LLC; Derek P. Martin

(57) ABSTRACT

An optimizing compiler includes a vector optimization mechanism that optimizes vector instructions by eliminating one or more vector element reverse operations. The compiler can generate code that includes multiple vector element reverse operations that are inserted by the compiler to account for a mismatch between the endian bias of the instruction and the endian preference indicated by the programmer or programming environment. The compiler then analyzes the code and reduces the number of vector element reverse operations to improve the run-time performance of the code. The compiler generates a debugger table that specifies which instructions have corresponding reformatting operations. A debugger then uses the debugger table to display contents of the vector register, which is displayed in (Continued)

regular form as well as in a form that is reformatted according to information in the debugger table.

15 Claims, 17 Drawing Sheets

(56) References Cited

U.S. PATENT DOCUMENTS

| | | | |
|---|---|---|---|
| 5,828,884 A | 10/1998 | Lee et al. | |
| 5,881,288 A * | 3/1999 | Sumi | G06F 11/3624 |
| | | | 714/E11.209 |
| 5,968,164 A | 10/1999 | Loen et al. | |
| 5,987,248 A | 11/1999 | Murayama et al. | |
| 5,996,057 A | 11/1999 | Scales, III et al. | |
| 6,065,106 A * | 5/2000 | Deao | G06F 11/362 |
| | | | 712/227 |
| 6,351,750 B1 * | 2/2002 | Duga | G06F 13/4013 |
| 7,552,427 B2 | 6/2009 | Adiletta et al. | |
| 7,600,155 B1 * | 10/2009 | Nickolls | G06F 11/36 |
| | | | 714/38.13 |
| 7,716,642 B1 * | 5/2010 | Michael | G06F 11/3624 |
| | | | 717/124 |
| 8,010,953 B2 | 8/2011 | Gschwind | |
| 8,108,846 B2 | 1/2012 | Gschwind | |
| 8,255,886 B2 | 8/2012 | Lachner | |
| 8,255,891 B2 | 8/2012 | Chen et al. | |
| 8,458,681 B1 * | 6/2013 | Coutant | G06F 11/3624 |
| | | | 717/124 |
| 8,566,645 B2 | 10/2013 | Rentschler et al. | |
| 8,725,990 B1 | 5/2014 | Karandikar et al. | |
| 9,256,505 B2 | 2/2016 | Chakravarty | |
| 2001/0049763 A1 * | 12/2001 | Barry | G06F 9/3861 |
| | | | 710/264 |
| 2002/0199173 A1 * | 12/2002 | Bowen | G06F 11/362 |
| | | | 717/129 |
| 2003/0182650 A1 | 9/2003 | Smith | |
| 2004/0158819 A1 * | 8/2004 | Cuomo | G06F 11/3624 |
| | | | 717/128 |
| 2004/0221268 A1 * | 11/2004 | Nichols | G06F 11/362 |
| | | | 717/124 |
| 2004/0221274 A1 * | 11/2004 | Bross | G06F 8/51 |
| | | | 717/136 |
| 2004/0221276 A1 * | 11/2004 | Raj | G06F 7/768 |
| | | | 717/136 |
| 2004/0268094 A1 | 12/2004 | Abdallah et al. | |
| 2005/0066146 A1 * | 3/2005 | Barry | G06F 7/768 |
| | | | 711/201 |
| 2005/0125647 A1 | 6/2005 | Symes et al. | |
| 2006/0125663 A1 | 6/2006 | Adiletta et al. | |
| 2006/0243787 A1 * | 11/2006 | Dravnieks | G06F 11/3624 |
| | | | 235/100 |
| 2007/0226469 A1 | 9/2007 | Wilson et al. | |
| 2008/0098376 A1 | 4/2008 | Fulton et al. | |
| 2008/0288930 A1 | 11/2008 | Chen et al. | |
| 2009/0089547 A1 * | 4/2009 | Moyer | G06F 11/36 |
| | | | 712/205 |
| 2009/0198977 A1 | 8/2009 | Gschwind et al. | |
| 2010/0042815 A1 | 2/2010 | Gonion et al. | |
| 2010/0058302 A1 * | 3/2010 | Broscaru | G06F 8/47 |
| | | | 717/151 |
| 2011/0209003 A1 * | 8/2011 | Matsukawa | G06F 11/36 |
| | | | 714/30 |
| 2011/0271259 A1 * | 11/2011 | Moench | G06F 11/3628 |
| | | | 717/129 |
| 2012/0030652 A1 * | 2/2012 | Jelinek | G06F 9/44 |
| | | | 717/124 |
| 2012/0060016 A1 | 3/2012 | Eichenberger et al. | |
| 2012/0185836 A1 | 7/2012 | Loenko | |
| 2013/0247010 A1 * | 9/2013 | Bradbury | G06F 11/362 |
| | | | 717/130 |
| 2013/0263092 A1 * | 10/2013 | Chikahisa | G06F 11/3624 |
| | | | 717/126 |
| 2014/0019506 A1 | 1/2014 | Kuo | |
| 2014/0196013 A1 * | 7/2014 | Orr | G06F 11/3624 |
| | | | 717/125 |
| 2014/0201450 A1 | 7/2014 | Haugen | |
| 2014/0298336 A1 * | 10/2014 | Taniuchi | G06F 11/36 |
| | | | 718/1 |
| 2015/0095626 A1 * | 4/2015 | Nakagawa | G06F 11/36 |
| | | | 712/227 |
| 2015/0106793 A1 * | 4/2015 | Kahne | G06F 11/3648 |
| | | | 717/130 |
| 2015/0169294 A1 * | 6/2015 | Brock | G06F 11/36 |
| | | | 717/164 |
| 2015/0186232 A1 * | 7/2015 | Conner | G06F 11/3024 |
| | | | 714/45 |
| 2015/0261636 A1 | 9/2015 | Chakravarty | |
| 2015/0277880 A1 | 10/2015 | Gschwind et al. | |
| 2015/0331783 A1 * | 11/2015 | Blackman | G06F 11/3624 |
| | | | 717/124 |
| 2016/0217197 A1 * | 7/2016 | Rachlin | G06F 9/546 |

OTHER PUBLICATIONS

Watson, Greg, and David Abramson. The architecture of a parallel relative debugger, [Online] 2000, Proceedings of the 13th International Conference on Parallel and Distributed Computer Systems. 2000, [Retrieved from the Internet] <http://citeseerx.ist.psu.edu/viewdoc/download?doi=10.1.1.444.7514&rep=rep1&type=pdf> 8 pages total.*
Protze, Joachim, et al. Lessons Learned from Implementing OMPD: A Debugging Interface for OpenMP, [Online] Nov. 26, 2015, International Workshop on OpenMP. Springer International Publishing, [Retrieved from the Internet] 2015 <http://link.springer.com/chapter/10.1007/978-3-319-24595-9_7> 13 pages total.*
Gschwind et al., "Compiler Optimizations for Vector Instructions" U.S. Appl. No. 14/576,942, filed Dec. 19, 2014.
Gschwind et al., "Compiler Optimizations for Vector Instructions" U.S. Appl. No. 14/584,385, filed Dec. 29, 2014.
Gschwind et al., "Compiler Method for Generating Instructions for Vector Operations on a Multi-Endian Processor" U.S. Appl. No. 14/576,391, filed Dec. 19, 2014.
Gschwind et al., "Compiler Method for Generating Instructions for Vector Operations on a Multi-Endian Processor" U.S. Appl. No. 14/583,674, filed Dec. 27, 2014.
Gschwind et al., "Compiler Method for Generating Instructions for Vector Operations in a Multi-Endian Instruction Set" U.S. Appl. No. 14/576,710, filed Dec. 19, 2014.
Gschwind et al., "Compiler Method for Generating Instructions for Vector Operations in a Multi-Endian Instruction Set" U.S. Appl. No. 14/583,691, filed Dec. 27, 2014.
Gschwind et al., "Compiler Optimizations for Vector Operations That Are Reformatting-Resistant" U.S. Appl. No. 14/827,639, filed Aug. 17, 2015.
Gschwind et al., "Compiler Optimizations for Vector Operations That Are Reformatting-Resistant" U.S. Appl. No. 14/840,695, filed Aug. 31, 2015.
Gschwind et al., "Debugger Display of Vector Register Contents After Compiler Optimizations for Vector Instructions" U.S. Appl. No. 14/845,967, filed Sep. 4, 2015.
List of IBM Patents or Patent Applications Treated as Related.
Rohou et al., "Vectorization Technolgn to Improve Interpreter Performance", ACM Transactions on Architecture and Code Optimization, vol. 9, No. 4, Article 26, Jan. 2013.
Ziantz, LH. et al.; "Run-time optimization of sparse matrix-vector multiplication on SIMD machines"; PARLE '94. Parallel Architectures and Languages Europe. 6th International PARLE Conference Proceedings, pp. 313-322, 1994.
Software Patent Institute et al.; "Measuring User Programs for a SIMD Processor"; an IP.com Prior Art Database Technical Disclosure; http://ip.com/IPCOM/000150988; Apr. 19, 2007.
Software Patent Institute et al.; "Compiling Ordinary Programs for Execution on an Asynchronous Multiprocessor"; an IP.com Prior Art Database Technical Disclosure; http://ip.com/IPCOM/000148160; Apr. 12, 2007.

(56) References Cited

OTHER PUBLICATIONS

Brevnov et al., "Writing a Bi-Endian Compiler", Dr. Dobb's, The World of Software Development, Jul. 2, 2012.
Rajamohan, Srijith, "A Neural Network Based Classifier on the Cell Broadband Engine", The Pennsylvania State University, Aug. 2009.
Bailey et al., "Processor-Centric Design: Processors, Multi-Processors, and Software", Chapter 6 of ESL Models and their Applications, Embedded Systems, 2010.
Ren, Gang, "Compiling Vector Programs for SIMD Devices", Dissertation, University of Illinois at Urbana-Champaign, 2006, retrieved from the Internet: <URL:https://www.ideals.illinois.edu/handle/21421/11226>.

\* cited by examiner

| Vector Optimization Rules | 600 |
|---|---|
| Eliminate Unneeded vreverse Operations when One vreverse Operation Feeds Another vreverse Operation | 610 |

FIG. 6 vector signed long a, b;
...
a = b;

FIG. 7 vload t1 = a
vreverse t2 = t1
vreverse t3 = t2
vstore b = t3

FIG. 8 vload t1 = a
vcopy t3 = t1
vstore b = t3

FIG. 9 vload t = a
vstore b = t

FIG. 10

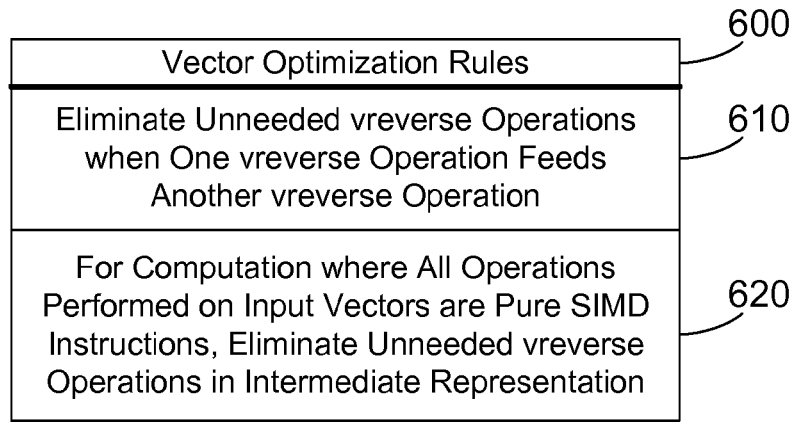

| Vector Optimization Rules | 600 |
| --- | --- |
| Eliminate Unneeded vreverse Operations when One vreverse Operation Feeds Another vreverse Operation | 610 |
| For Computation where All Operations Performed on Input Vectors are Pure SIMD Instructions, Eliminate Unneeded vreverse Operations in Intermediate Representation | 620 |

FIG. 11 y = (x + z) & w;

FIG. 12 vload t1 = x
vreverse t2 = t1
vload t3 = z
vreverse t4 = t3
vadd t5 = t2, t4
vload t6 = w
vreverse t7 = t6
vand t8 = t5, t7
vreverse t9 = t8
vstore y = t9

FIG. 13

vload t1 = x
vload t3 = z
vadd t10 = t1, t3
vload t6 = w
vand t11 = t10, t6
vstore y = t11

FIG. 14 lvx + vreverse4x4 ⟷ lvxw4x
lvx + vreverse2x8 ⟷ lxdv2x
vreverse4x4 + stvx ⟷ stvxw4x
vreverse2x8 + stvx ⟷ stvxd2x vload t1 = literal
vreverse t2 = t1    ⟷    vload t2 = vreverse(literal)

```
...
0x00001000      lxvd2x 0,1,3
0x00001004      li 6, 10
0x00001008      mtctr 6
0x0000100c      lxvd2x 1,1,4
0x00001010      lxvd2x 2,1,5
0x00001014      xvmaddmdp 0,1,2
0x00001018      addi 4,4,16
0x0000101c      addi 5,5,16
0x00001020      bdnz 0x0000100c
0x00001024      stxvd2x 0,1,3
...
```

| Vector Register | Address | Reformatting Type |
|---|---|---|
| VR0 | 0x00001004 | Swap |
| VR0 | 0x00001008 | Swap |
| VR0 | 0x0000100c | Swap |
| VR1 | 0x0000100c | Swap |
| VR2 | 0x0000100c | Swap |
| VR0 | 0x00001010 | Swap |
| VR1 | 0x00001010 | Swap |
| VR2 | 0x00001010 | Swap |
| VR0 | 0x00001014 | Swap |
| VR1 | 0x00001014 | Swap |
| VR2 | 0x00001014 | Swap |
| VR0 | 0x00001018 | Swap |
| VR1 | 0x00001018 | Swap |
| VR2 | 0x00001018 | Swap |
| VR0 | 0x0000101c | Swap |
| VR1 | 0x0000101c | Swap |
| VR2 | 0x0000101c | Swap |
| VR0 | 0x00001020 | Swap |
| VR1 | 0x00001020 | Swap |
| VR2 | 0x00001020 | Swap |
| VR0 | 0x00001024 | Swap |
| VR1 | 0x00001024 | Swap |
| VR2 | 0x00001024 | Swap |

FIG. 37

| Vector Register | Address | Reformatting Type |
|---|---|---|
| VR0 | 0x00001004 | Swap |
| VR0 | 0x00001008 | Swap |
| VR0 | 0x0000100c | Swap |
| VR0 | 0x00001010 | Swap |
| VR0 | 0x00001014 | Swap |
| VR0 | 0x00001018 | Swap |
| VR0 | 0x0000101c | Swap |
| VR0 | 0x00001020 | Swap |
| VR0 | 0x00001024 | Swap |
| VR1 | 0x0000100c | Swap |
| VR1 | 0x00001010 | Swap |
| VR1 | 0x00001014 | Swap |
| VR1 | 0x00001018 | Swap |
| VR1 | 0x0000101c | Swap |
| VR1 | 0x00001020 | Swap |
| VR1 | 0x00001024 | Swap |
| VR2 | 0x0000100c | Swap |
| VR2 | 0x00001010 | Swap |
| VR2 | 0x00001014 | Swap |
| VR2 | 0x00001018 | Swap |
| VR2 | 0x0000101c | Swap |
| VR2 | 0x00001020 | Swap |
| VR2 | 0x00001024 | Swap |

129

| Vector Register | Start Address | End Address | Reformatting Type |
|---|---|---|---|
| VR0 | 0x00001004 | 0x00001024 | Swap |
| VR1 | 0x0000100c | 0x00001024 | Swap |
| VR2 | 0x0000100c | 0x00001024 | Swap |

DEBUGGER DISPLAY OF VECTOR REGISTER CONTENTS AFTER COMPILER OPTIMIZATIONS FOR VECTOR INSTRUCTIONS

BACKGROUND

1. Technical Field

This disclosure generally relates to computer systems, and more specifically relates to compilers that generate executable code for computer systems and debuggers.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have from tens of thousands to many millions of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the number, arrangement and type of instructions within the computer program. Many different optimizations have been developed so the code produced by compilers has better run-time performance.

BRIEF SUMMARY

An optimizing compiler includes a vector optimization mechanism that optimizes vector instructions by eliminating one or more vector element reverse operations. The compiler can generate code that includes multiple vector element reverse operations that are inserted by the compiler to account for a mismatch between the endian bias of the instruction and the endian preference indicated by the programmer or programming environment. The compiler then analyzes the code and reduces the number of vector element reverse operations to improve the run-time performance of the code. The compiler generates a debugger table that specifies which instructions have corresponding reformatting operations. A debugger then uses the debugger table to display contents of the vector register, which is displayed in regular form as well as in a form that is reformatted according to information in the debugger table.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 6 is a diagram of a table that shows an example of the vector instruction processing rules shown in FIG. 1;

FIG. 7 is a diagram showing a sample snippet of code processed by a compiler;

FIG. 8 is a diagram showing instructions generated by the compiler as a result of processing the instructions in FIG. 7;

FIG. 9 is a block diagram illustrating a first possible compiler optimization for the instructions in FIG. 8;

FIG. 10 is a block diagram illustrating a second possible compiler optimization for the instructions in FIG. 9;

FIG. 11 shows the table 600 in FIG. 6 with an added vector optimization rule;

FIG. 12 is a diagram showing a sample snippet of code processed by a compiler;

FIG. 13 is a diagram showing instructions generated by the compiler as a result of processing the instructions in FIG. 12;

FIG. 14 is a block diagram illustrating a compiler optimization for the instructions in FIG. 13;

Figures 35, 36:
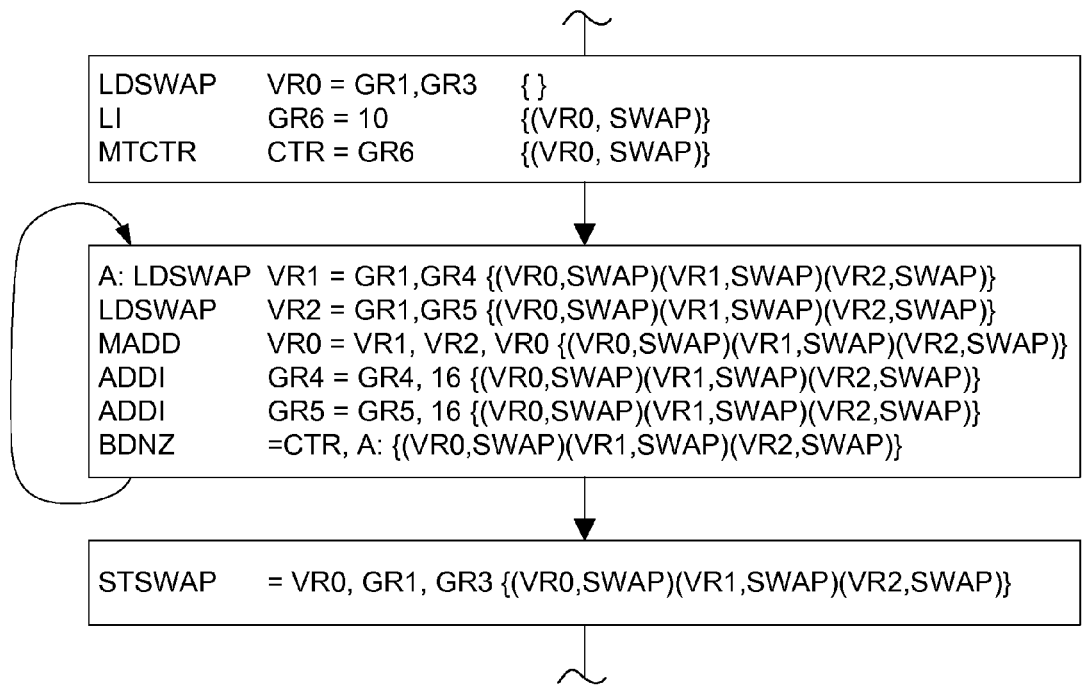
Figures 38, 39:

FIGS. 30-35 each shows parts of a control flow graph of an example computer program to illustrate some of the concepts disclosed herein;

FIG. 36 shows assembly code corresponding to the control flow graph in FIG. 35;

FIG. 37 is a table showing vector registers, corresponding addresses, and corresponding reformatting types;

FIG. 38 is the table in FIG. 37 reorganized according to vector registers; and

Figure 1:
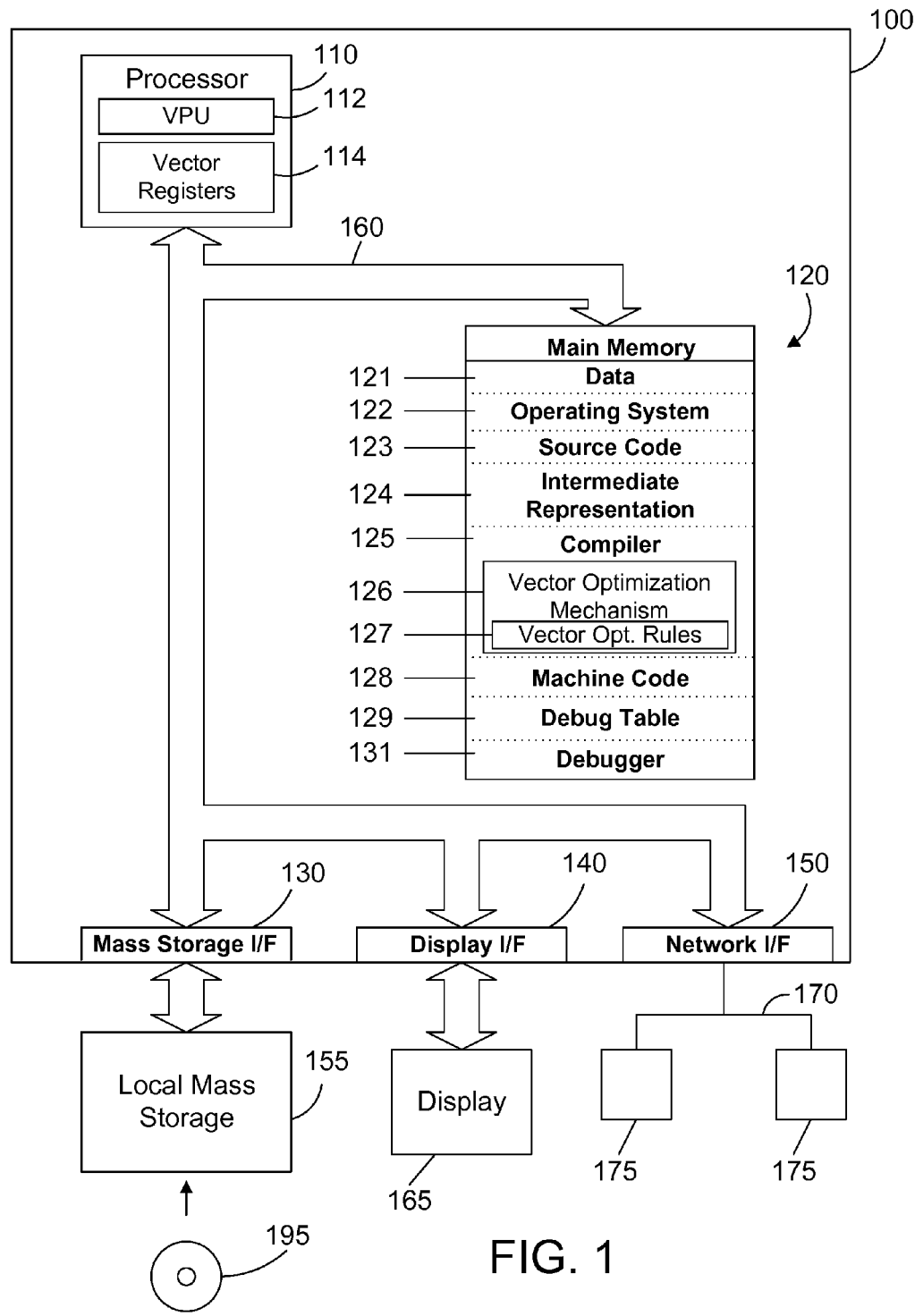
FIG. 1 is a block diagram of an apparatus that includes a vector optimization mechanism in a compiler.

FIG. 39 is one suitable example of the debug table 129 shown in FIG. 1 generated from the table in FIG. 38.

DETAILED DESCRIPTION

Exploiting opportunities for parallel computation is very important for modern computing systems. One of the most common opportunities for parallel computation arises when the same operation is to be performed on an array (or "vector") of homogeneous data elements. Today's processor instruction set architectures (ISAs) usually include a set of single-instruction, multiple-data (SIMD) instructions that can operate on 2, 4, 8, 16, or 32 values simultaneously. SIMD instructions are examples of what are more broadly termed vector instructions as used herein. For example, the Power ISA currently defines the Vector Add Floating-Point (vaddfp) instruction. This instruction operates on 128-bit vector registers, whose contents are interpreted as four 32-bit floating-point values. The corresponding values in each input register are added together and placed in the corresponding position in the output register. Thus four additions are performed using a single instruction.

Another aspect of today's processors is the concept of "endianness." This refers to how the processor stores bytes of a multi-byte value in memory. For example, a 64-bit integer in a machine register contains 8 bytes, arranged from most-significant byte (MSB) containing the bits representing the largest portions of the integer, to the least-significant byte (LSB) containing the bits representing the smallest portions of the integer. On a so-called Big Endian (BE) architecture, the same value is stored in memory with byte 0 containing the MSB, and byte 7 containing the LSB. On a so-called Little Endian (LE) architecture, the value is stored in memory with byte 0 containing the LSB, and byte 7 containing the MSB. These two methods arose for historical performance reasons that no longer matter a great deal, except that in today's world we must deal with these two incompatible views of memory.

BE and LE systems typically view values differently in vector registers as well. When an array of four 32-bit values is loaded into a 128-bit BE vector register, the zeroth element of the array occupies the most significant bytes, while the third element of the array (zero-based indexing) occupies the least significant bytes. When the same array is loaded into a 128-bit LE vector register, the zeroth element of the array occupies the least significant bytes, while the third element of the array occupies the most significant bytes. These are considered to be the "natural element order" for BE and LE memory models. The contents of each 4-byte element are represented in the same fashion on both BE and LE architectures, with the sign bit of the floating-point value placed in the most significant bit of the element.

Some ISAs (Power and ARM, for example) are designed to operate either in Big Endian mode or in Little Endian mode. In the Power ISA, the endian mode is selected with a control bit in the machine state register (MSR). Thus the same instructions are available to carry out computation regardless of endianness. This is of no concern for instructions such as "vaddfp" described above, where the computation is performed uniformly on all elements of the instruction's input and output registers. However, when an instruction implicitly or explicitly refers to the element numbering within a vector register, the numbering that is natural for one endianness is unnatural for the other.

In some cases, an ISA may provide instructions to facilitate maintaining elements in vectors using a particular element order, regardless of the endian mode specified by the programmer. For example, the Load VSX Vector Doubleword*2 Indexed (lxvd2x) instruction in the Power ISA specifically loads elements into a vector register using the BE natural element order, whether or not the machine is using the BE memory model or the LE memory model. Similarly, the Store VSX Vector Doubleword*2 Indexed (stxvd2x) reverses this transformation, storing to memory as though the elements in the vector register use the BE natural element order. Using these instructions allows a programmer to ignore the actual endian memory model in use, for a subset of data types and instructions. Data within each element are formatted in memory based on the selected endian model, e.g., in accordance with the mode selected by MSR[LE].

An instruction that regards vector elements in vector registers using BE natural element order is said to have a BE vector element endian bias. Conversely, an instruction that regards vector elements in vector registers using LE natural element order is said to have an LE vector element endian bias. When the preponderance of vector instructions in an ISA have the same endian bias, this is referred to as the inherent endian bias of the ISA.

Figure 2:
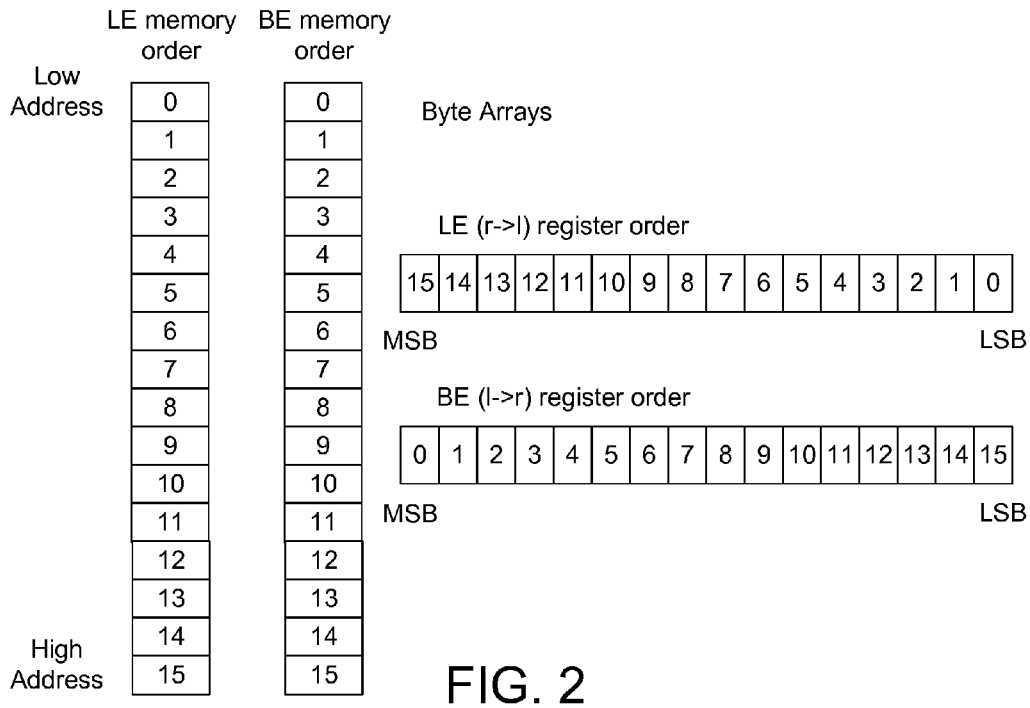
FIG. 2 is a block diagram illustrating how a byte array is stored in little endian and big endian systems.
Figure 3:
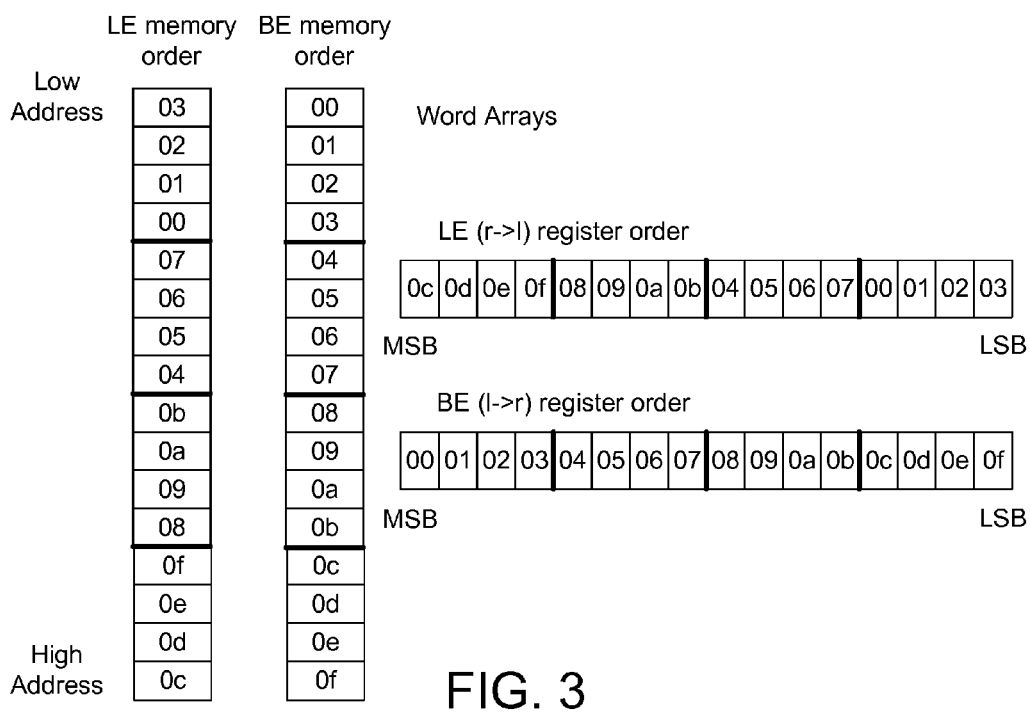
FIG. 3 is a block diagram illustrating how a word array is stored in little endian and big endian systems.

FIGS. 2 and 3 show examples of how data arrays may be represented in memory, using big-endian and little-endian data representation, and how they may be represented in vector registers, using l→r and r→l element ordering. In FIG. 2, an array of bytes containing {0, 1, ..., 15} is shown. Since each vector element is one byte long, the little-endian (LE) and big-endian (BE) representations in memory are identical, with the first element stored in the lowest address. Using r→l element ordering (LE), the first element is stored in the least significant byte (LSB) of the vector register; while using l→r element ordering (BE), the first element is stored in the most significant byte (MSB).

FIG. 3 shows representations for an array of 4-byte integers, containing {0x00010203, 0x04050607, 0x08090a0b, 0x0c0d0e0f}. In memory, elements appear in ascending address order for both BE and LE, but the byte order within each element differs. In registers, the opposite is true: the elements appear from right to left using r→l order (LE) and from left to right using l→r order (BE), but within each element the byte ordering is identical. Thus, we see the 4-byte integer stored in the least significant four bytes of the LE register are the same order, namely 00, 01, 02, 03 as the 4-byte integer stored in the most significant four bytes of the BE register. The order that changes is the order of elements, not the order of bytes within the elements.

The two related applications cited herein disclose ways for a compiler to insert one or more vector element reverse operations into a computer program to account for a mismatch in endian bias. The addition of vector element reverse operations reduces performance of the code, but assures correct operation. The compiler herein analyzes the code that includes the added vector element reverse operations and eliminates one or more of the vector element reverse operations to improve performance of the code. The compiler generates a debugger table that specifies which instructions have corresponding reformatting operations. A debugger then uses the debugger table to display contents of the vector register, which is displayed in regular form as well as in a form that is reformatted according to information in the debugger table.

Referring to FIG. 1, a computer system 100 is one suitable implementation of a server computer system that includes a compiler with a vector optimization mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, source code 123, an intermediate representation 124, a compiler 125, machine code 128, a debug table 129, and a debugger 131. Data 121 represents any data that serves as input to or output from any program in computer system 100. Operating system 122 is a multitasking operating system. There are three different representations of a computer program in FIG. 1, namely the high-level source code 123, the intermediate representation 124 that is generated by a front-end compiler from the source code 123, and the machine code 128 that is generated by a back-end compiler from the intermediate representation 124. The vector optimization mechanism 126 disclosed herein could be implemented within a front-end compiler, within a back-end compiler, or different aspects of the vector optimization mechanism 126 could be implemented in both a front-end compiler and a back-end compiler. The compiler 125 thus could represent either a front-end compiler, a back-end compiler, or a full compiler that includes a front-end and a back-end. The compiler 125 includes the vector optimization mechanism 126 that optimizes vector instructions according to defined vector optimization rules 127. The compiler 125 also generates the debug table 129 as described in more detail below. The debugger 131 is used by a programmer to debug the computer program, and preferably uses the debug table 129 to correctly display contents of vector registers to a programmer.

Note the source code 123, intermediate representation 124, compiler 125, and machine code 128 are all shown residing in memory 120 for the convenience of showing all of these elements in one drawing. One skilled in the art will appreciate that this is not the normal mode of operation for most compilers. A front-end compiler processes source code 123 and generates therefrom intermediate representation 124. This processing may occur on a computer system separate from computer system 100. A back-end compiler processes intermediate representation 124 and generates therefrom machine code 128, which may also occur on a separate computer system. Compiler 125 could be a front-end compiler, or could be a compiler that includes both a front end and a back end. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. A back-end compiler could be executed on a fourth computer system, which reads the intermediate representation 124 from the third computer system, and generates therefrom machine code 128, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above. In addition, the vector optimization mechanism 126 can include different portions implemented in different parts of the compiler.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, source code 123, intermediate representation 124, compiler 125, and machine code 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 125. Processor 110 preferably includes a vector processing unit (VPU) 112 and multiple vector registers 114. The VPU 112 and vector registers 114 allow the processor to execute Single Instruction Multiple Data (SIMD) instructions, which are examples of vector instructions discussed herein.

Although computer system 100 is shown to contain only a single processor and a single system bus, those skilled in the art will appreciate that a compiler as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A compiler as disclosed and claimed herein includes a vector optimization mechanism that optimizes vector instructions by eliminating one or more vector element reverse operations. The compiler can generate code that includes multiple vector element reverse operations that are inserted by the compiler to account for a mismatch between the endian bias of the instruction and the endian preference indicated by the programmer or programming environment. The compiler then analyzes the code and reduces the number of vector element reverse operations to improve the run-time performance of the code. The compiler generates a debugger table that specifies which instructions have corresponding reformatting operations. A debugger then uses the debugger table to display contents of the vector register, which is displayed in regular form as well as in a form that is reformatted according to information in the debugger table.

Figure 4:
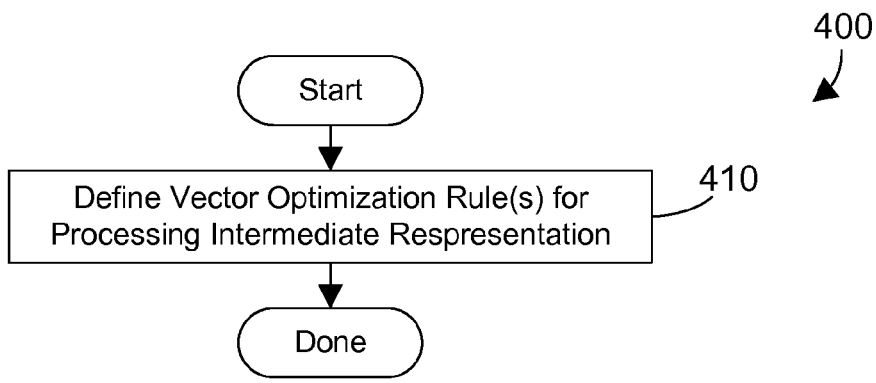
FIG. 4 is a flow diagram of a method for defining vector optimization rules for a compiler to optimize vector instructions.
Figure 5:
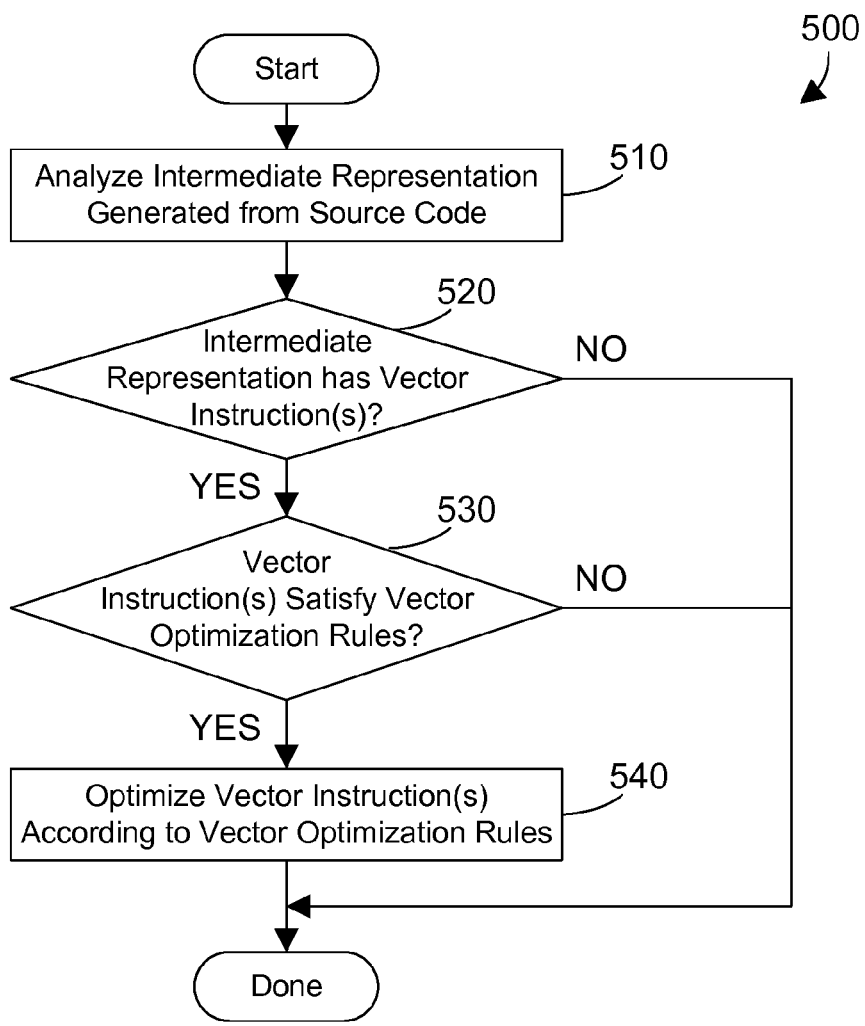
FIG. 5 is a flow diagram of a method for a compiler to optimize vector instructions according to defined vector instruction processing rules.

Referring to FIG. 4, method 400 defines one or more vector optimization rules for processing an intermediate representation of the code (step 410). The vector optimization rules defined in step 410 correspond to vector optimization rules 127 shown in FIG. 1. A method 500 shown in FIG. 5 analyzes the intermediate representation generated from the source code (step 510). When the intermediate representation has no vector instructions (step 520=NO), method 500 is done. When the intermediate representation has one or more vector instructions (step 520=YES), but the vector instruction(s) do not satisfy the vector optimization rules (step 530=NO), method 500 is done. When the vector instruction(s) satisfy the vector optimization rules (step 530=YES), the vector instruction(s) are optimized according to the vector optimization rules (step 540). The optimization in step 540 can include, for example, eliminating one or more vector element reverse operations. Various examples are now presented to illustrate different optimizations that could be performed in step 540.

An example of a vector optimization rule 127 shown in FIG. 1 is shown in FIG. 6. For all vector copy operations, the unneeded vector element reverse (vreverse) operations in the intermediate representation are eliminated, as shown at 610.

The compiler herein can mitigate the performance cost of added vector element reverse operations, such as vector element reverse operations added by the compiler after vector load instructions and before vector store instructions. In this disclosure, we refer to any vector load instruction (whether biased-endian like "lxvd2x", or natural-endian like "lvx") as a vload, and similarly refer to any vector store instruction as a vstore. We will also refer to any operation that reverses the elements of a vector register as a vreverse, and to an instruction that copies the contents of one register into another as a vcopy. However, the methods described herein are equally applicable regardless of the kinds of loads, stores, and reverse operations employed.

A "vreverse operation" generally refers to a series of one or more instructions that reverses the order of elements in a vector register. There are different vreverse operations for each element size (1 byte, 2 bytes, 4 bytes, 8 bytes, 16 bytes, etc.). An ISA may, but need not, include machine instructions that map directly to vreverse operations of every size. Alternatively, more general instructions (such as permutes or shuffles) may be used instead.

In the most preferred implementation, there are preferably different vector element reverse instructions for each different element size that can be specified in an instruction set. Thus, if a system defines vectors with element sizes of bytes, halfwords (2 bytes), words (4 bytes) and doublewords (8 bytes), there will be a different vector element reverse instruction for each of these. For example, a byte vector element reverse instruction could be vreverse. A halfword vector element reverse instruction could be vreverse_hw. A word vector element reverse instruction could be vreverse_w. A double word vector element reverse instruction could be vreverse_dw. Of course, any suitable syntax could be used, and any suitable number of vector element reverse instructions could be defined, depending on the element sizes defined by the instruction set, whether currently known or developed in the future. For example, a quadword vector element reverse instruction could be defined and vector element reverse instructions for elements larger than quadwords could also be defined. For the simplicity of the examples herein, the size of the vector element reverse instruction is not specified, realizing that the size could vary as described above.

The compiler optimizations may be performed during any appropriate stage of the compilation process in order to eliminate one or more vreverse operations in the code. A compiler operates on one or more intermediate representations of code, which may be organized in various ways that may be more or less appropriate to a particular optimization. For example, an intermediate representation may represent expressions in a tree or directed-acyclic graph (DAG) form, or may use a variant of three-address code. Of course, many more variations are possible, whether currently known or developed in the future. This disclosure applies regardless of the chosen intermediate representation and without regard to specific unimportant details of how the optimizations are implemented.

In the simplest case, it is common for a vector to be copied from one memory location to another, such as shown in FIG. 7. Using various methods, including the methods disclosed in the two related application, the compiler could generate for the code in FIG. 7 the instructions shown in FIG. 8, where t1, t2, and t3 are vector registers. The effect of each vreverse is to reverse the order of the elements in the vector register. We assume for this example the vreverse t2=t1 instruction was added by the compiler to reverse the order of the vector elements after the vload t1=a instruction, and the vreverse t3=t2 instruction was added by the compiler to reverse the order of the vector elements before the vstore b=t3 instruction. Thus the first vreverse will reverse the elements, and the second vreverse will restore them to their original locations. If the value of t2 is not used anywhere else, the compiler may replace the instructions shown in FIG. 8 with the instructions shown in FIG. 9. Then, standard compiler optimizations known as copy propagation and/or value numbering can reduce the instructions in FIG. 9 to the instructions shown in FIG. 10. Note that all vreverse operations have been removed, so there is now no performance penalty.

More specifically, an exemplary compiler performing an exemplary translation of the code of FIG. 7 described in conjunction with these rules may generate assembly code corresponding to FIG. 8 for a little-endian environment in accordance with the instructions for POWER8 as follows:

lxvd2x 0,0,4
xxpermdi 0,0,0,2
xxpermdi 0,0,0,2
stxvd2x 0,0,3

An exemplary compiler may generate code corresponding to FIG. 10 for a little-endian environment in accordance with the POWER8 instruction set as follows:

lxvd2x 0,0,4
stxvd2x 0,0,3

Note that a code sequence where one vreverse operation feeds another vreverse operation for elements of the same size can arise in other contexts than a vector copy. For example, the optimization rules in rule 620 of FIG. 11 may introduce such a code sequence. At any time such a code sequence is introduced, every use of the result of the second vreverse operation may be replaced with the input to the first vreverse operation, and the second vreverse operation may be removed. If the result of the first vreverse operation is not used elsewhere, it may also be removed.

Recall that a vreverse operation may not be implemented as a single instruction. For example, the Power ISA implemented by the POWER8 processor does not include single instructions corresponding to vreverse operations for elements of size 1, 2, or 4 bytes. Consequently, a vector load of a data type such as vector char, vector short, vector int, or vector float is often implemented using a sequence of a vector load of two doublewords followed by a permute that reverses the elements, and a vector store of such a data type is often implemented using a sequence of a vector store of two doublewords preceded by a permute that reverses the elements.

Suppose a and b in FIG. 7 are of type vector signed int, rather than vector signed long. In accordance with one embodiment, this may be translated into a sequence similar to that of FIG. 8, but due to the lack of a suitable vreverse instruction for vector word elements, the generated sequence would be more expensive:

vload t1=a
vload rev_w=<control vector to reverse word elements>
vperm t2, t1, rev_w
vperm t3, t2, rev_w
vstore t3

As can be seen, this sequence requires an additional load of a vector permute control vector that instructs a permute instruction to reverse the word elements of a vector registers. Furthermore, using the POWER8 instruction set, only a subset of the vector registers may be used to perform a vector permute instruction, which may lead to additional register copy instructions, data spills to memory, and so forth.

The vector word copy sequence may be translated into an intermediate representation which may load words with an element order of element 1, element 0, element 3, element 2 (denoted hereafter by vload_w1032) and use a suitable big-endian permutation (2,3,0,1) to create the "normal" little-endian order (3,2,1,0), and the converse operations for a vector store. This provides the following initial translation to an intermediate representation:

vload_w1032 t1=a
vperm_w2301 t2=t1
vperm_w2301 t3=t2
vstore_w1032 b=t3

Advantageously, vload_w1032 may be implemented by an lxvd2x instruction, vperm_2301 may be implemented by an xxpermdi instruction, and vstore_w1032 may be implemented by an stxvd2x instruction. This yields the following improved copy sequence:

lxvd2x 0,0,4
xxpermdi 0,0,0,2
xxpermdi 0,0,0,2
stxvd2x 0,0,3

Note that, although we are using it on a vector of words, vperm_w2301 is actually a vreverse operation for doublewords. Thus in accordance with the teachings herein, since the first vperm_w2301 instruction feeds the second vperm_w2301 instruction, and the result of the first vperm_w2301 instruction is not used elsewhere, the two vperm_w2301 instructions may be removed as above, yielding:

vload_w1032 t1=a
vstore_w1032 b=t1

This final intermediate representation may then be translated to the following code to copy a vector of word elements:

lxvd2x 0,0,4
stxvd2x 0,0,3

FIG. 11 shows the table 600 of vector optimization rules that includes an additional rule 620 that states that for computations where all operations performed on input vectors are pure SIMD instructions, eliminate the unneeded vector element reverse operations in the intermediate representation. Suppose we have a computation where all operations performed on the input vectors are pure SIMD instructions; that is, the instructions perform parallel computations on the corresponding elements of all input vectors independently. In this case, the relative order of elements within the registers will not affect the final results as long as it is consistent, and we can avoid vreverse operations for the entire sequence. A sample source statement is shown in FIG. 12. Letting vadd represent vector addition and vand represent vector bit-wise AND, the compiler could generate the code shown in FIG. 13, where t1 through t9 are vector registers. If the compiler recognizes that none of the reversed values t2, t4, t5, t7, and t8 is used outside this sequence, then the entire sequence can be converted to the instructions shown in FIG. 14. One way to implement this is to first apply the rule from the example shown in FIGS. 18 and 19, below, to the vadd, then apply the same rule to the vand, and finally apply the rule from the example in FIGS. 7-10. Another possible implementation is to analyze webs of computation where all sources originate from loads after which vector element reverse operations have been added and all sinks flow into stores before which vector element reverse operations have been added. The former is simpler to implement and faster to optimize, while the latter is more general and can be performed on computations that contain loops. Any implementation in which the instructions producing intermediate results and other instructions consuming those intermediate results are identified can be used. Examples include the well known Value Numbering, Value Propagation, Reaching Analysis, Instruction Generation Folding, and Peephole optimizations.

Using the POWER8 instruction set, the compiler may be presented with a variant of FIG. 13 that operates on a vector of single precision floating-point elements of 4-byte size:

vload_w1032 t1=x
vperm_w2301 t2=t1
vload_w1032 t3=z
vperm_w2301 t4=t3 vadd_fp t5=t2, t4
vload_w1032 t6=w
vperm_w2301 t7=t6
vand_w t8=t5, t7
vperm_w2301 t9=t8
vstore_w1032 y=t9

In conjunction with the teachings herein, the compiler generates:
vload_w1032 t1=x
vload_w1032 t3=z
vadd_fp t5=t2, t4
vload_w1032 t6=w
vand_w t8=t5, t7
vstore_w1032 y=t9

The intermediate representation may then be translated into the following machine instruction sequence on a POWER8 processor:
lxvd2x 0,0,4
lxvd2x 1,0,5
xvaddsp 0,0,1
lxvd2x 12,0,6
xxland 0,0,12
stxvd2x 0,0,9

A variant on the example in FIGS. 11-14 occurs when the compiler automatically generates vector code from scalar code. This "auto-vectorization" optimization may be performed on loops over array elements or on straight-line sections of code that make references to adjacent array elements. The compiler can replace operations on individual array elements with SIMD instructions that operate on several elements in parallel.

When auto-vectorized code is generated, the same sort of transformations can be made as shown in FIGS. 13 and 14. However, it may be easier in some cases for the compiler to recognize these cases. The compiler may generate special symbols or flags associated with vector loads and stores created for auto-vectorization, and thereby know that the vloads and vstores that it generates need not have vreverses inserted.

Figure 15:
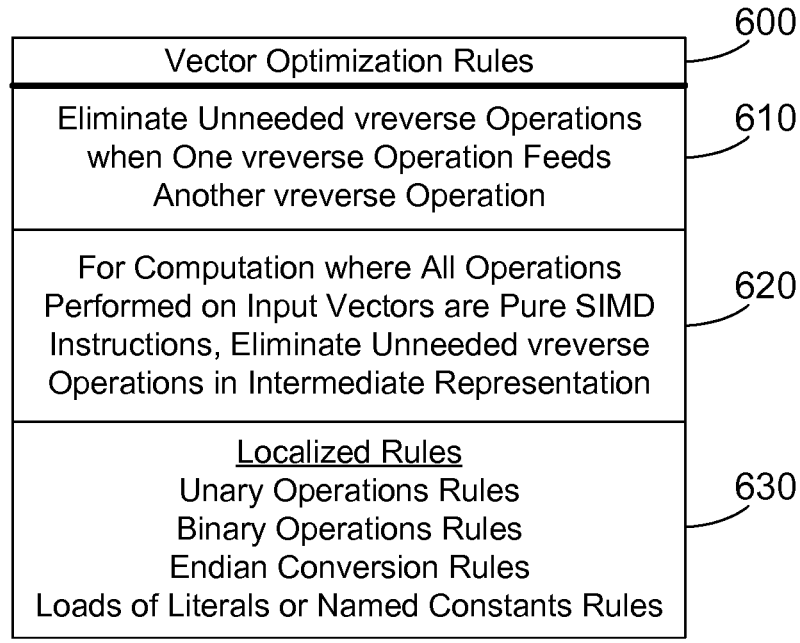
FIG. 15 shows the table 600 in FIGS. 6 and 11 with localized vector optimization rules.

Even when an entire expression may not be optimized as shown in FIGS. 13-14, subexpressions may be optimized with localized rules. Examples of localized rules are shown at 630 in FIG. 15 to include unary operations rules, binary operations rules, endian conversion rules, and loads of literals or named constants rules. Examples of each of these follow.

Figures 16, 17:
FIG. 16 is a diagram showing a sample snippet of code processed by a compiler.
FIG. 17 is a diagram showing instructions generated by the compiler as a result of processing the instructions in FIG. 16.

For some unary operations such as negate, the instructions in FIG. 16 can be changed to the instructions in FIG. 17, or vice versa. While this does not reduce the number of instructions, the changed order of instructions may result in making optimization possible that was not possible before. For example, if a vector reverse operation preceded the unaryop y=x instruction, switching the order of the instructions as shown in FIG. 17 could result in two consecutive vreverse operations, which could then be optimized by removing the vreverse operations as shown in FIGS. 8-10. Even when the reversal does not allow eliminating a vreverse operation, it may improve performance by allowing one or more other instructions to use the result of the unary operation sooner.

Figures 18, 19:
FIG. 18 is a block diagram showing a sample snippet of code processed by a compiler.
FIG. 19 is a diagram showing instructions generated by the compiler as a result of processing the instructions in FIG. 18.

For pure SIMD binary operations, the instructions shown in FIG. 18 could be reduced to the instructions shown in FIG. 19. Conversions between natural-endian loads/stores and biased-endian loads/stores are possible given the correct vreverses for the type. For example, referring to FIGS. 20 and 21, an instruction lvx+vreverse4x4 can be converted to lvxw4x, where "vreverseNxS" represents reversal of a vector having N elements, each of which has size S bytes. An instruction lvx+vreverse2x8 can be converted to lxvd2x. An instruction vreverse4x4+stvx can be converted to stvxw4x. An instruction vreverse2x8+stvx can be converted to stvxd2x. Note that it may also be beneficial to make the reverse transformation, for example, converting a lxvd2x into a an lvx+vreverse2x8. If the lxvd2x is itself followed by a vreverse2x8, this will produce back-to-back vreverse2x8 instructions that can then be eliminated as shown in FIGS. 8-10.

Figures 20, 21, 22, 23, 24:
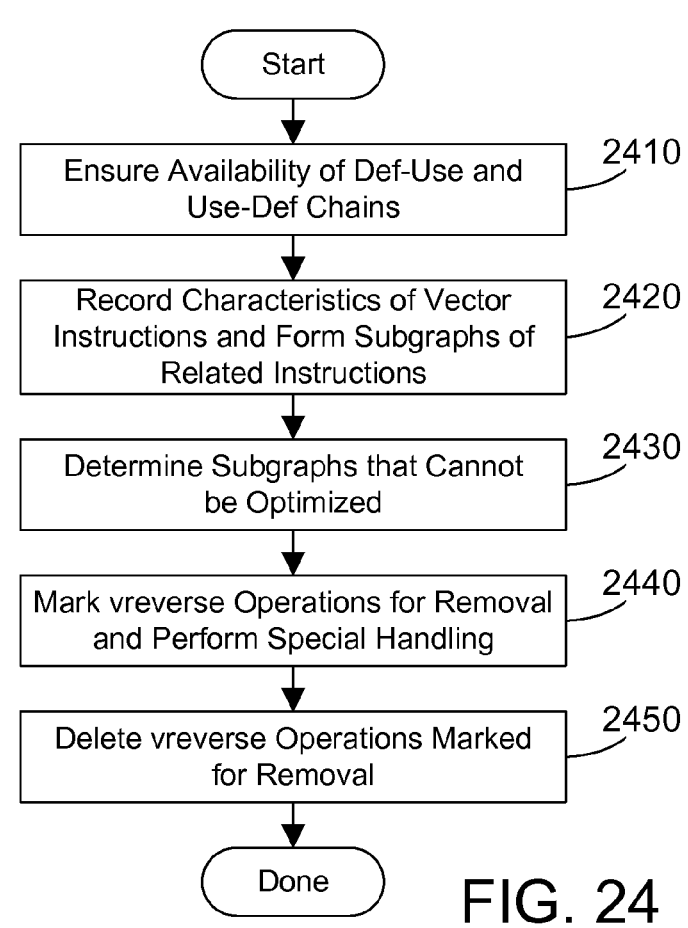
FIG. 20 is a block diagram showing endian-biased instructions with vector element reverse operations.
FIG. 21 is a diagram showing conversion of the multiple instructions in FIG. 20 to a single instruction.
FIG. 22 is a block diagram showing a sample snippet of code processed by a compiler.
FIG. 23 is a diagram showing instructions generated by the compiler as a result of processing the instructions in FIG. 22.
FIG. 24 is a flow diagram of a specific method for the optimizing compiler shown in FIG. 1 to perform vector optimizations based on vector optimization rules.

For loads of literals or named constants, the two instructions shown in FIG. 22 can be converted to the one instruction shown in FIG. 23, where "vreverse(literal)" represents the vector literal with its elements reversed in memory. In some cases the reverse transformation is also useful, to enable other transformations; for example, so that both inputs to an add are vreverse operations.

As a general rule, combinations of vreverse with binary or unary operations should be transformed first, and combinations of vreverse with loads and stores should be transformed last, in order to maximize other opportunities. These and other transformations may be used to reduce the number of vreverse operations added to the generated code. For instance, there are many rules specific to a particular instruction set architecture that may be applied to optimize combinations of vreverse and other instructions. In some cases another pass over the non-load or store instructions can find more opportunities.

Referring to FIG. 24, a method 2400 shows one possible method that could be performed by the compiler as described herein. The optimization requires pre-computation of def-use and use-def chains (step 2410). This is an industry-standard analysis to produce data structures that represent register relationships between instructions. If an instruction I modifies (defines) a register R, then the def-use chain for (I,R) lists all instructions that consume that definition of R. Also, if an instruction I makes use of a register R, then the use-def chain for (I,R) lists all instructions that could provide the definition of R that I uses. In many optimizers, def-use and use-def chains are maintained throughout the optimization phases. In this case, step 2410 requires no work. Otherwise, step 2410 performs this industry-standard analysis to make the chains available.

Next, step 2420 is performed as follows. The compiler walks through every instruction in the intermediate representation of the current function. For each instruction I, check whether I mentions a vector register. If not, continue to the next instruction. Otherwise, mark I as "relevant." For each use of a register R in I, union {I} with each instruction in the use-def chain for (I,R). For each definition of a register R in I, union {I} with each instruction in the def-use chain for (I,R). If I is a load or store, record that information. If I is a vreverse operation, record that as well. If I is not a vreverse operation, determine whether it is swappable (is not sensitive to element order) or swappable with special handling (is sensitive to element order, but can be modified if its containing subgraph is optimized). Note that an instruction can be both a load or a store, and a vector reverse that indicates a load or store like lxvd2x. If I contains a register use that is live on entry to the function, record that information. If I defines a register that is live on exit from the function, record that information. When step 2420 is finished, the relevant instructions in the function have been partitioned into maximal subgraphs of vector computation. Each subgraph has a representative instruction, as determined by the classic set-union algorithm.

At this point step 2430 is performed as follows. Walk through each instruction a second time. If anything about the instruction makes the web not optimizable, record this fact in the representative instruction of its subgraph. This includes the instruction being marked live on entry or live on exit, a load or store that is not permuting (and is not swappable with special handling), a permuting load or store that is not accompanied by a register swap, or an instruction that is not marked as either a swap or swappable.

Next, step 2440 is performed as follows. Walk through each instruction a third time, looking for permuting loads and stores that are accompanied by a vector element reverse operation, and whose representative instruction has not been marked as not optimizable. Mark the accompanying vector element reverse operations for future removal. During the same pass, look for instructions that have been marked as swappable with special handling, and whose representative instruction has not been marked as not optimizable. Perform the special handling for these. Examples of special handling include changing the element number on the instruction, such as for a vector-splat, vector-insert or vector-extract operation, changing the element number selectors in a permute or shuffle instruction, changing an instruction operating on even elements, odd elements, upper elements or lower elements to the opposite, converting a non-permuting load or store into a permuting one, and swapping the elements in a constant vector.

Next, step 2450 is performed as follows. Walk through the instructions a fourth time, looking for vector element reverse operations that have been marked for deletion, and replace each of them with a register copy. It is necessary to do this separately from step 2440 because a single swap can be associated with more than one load or store due to other optimizations. Method 2400 is then done.

Most SIMD instructions operate on corresponding elements of several input and output vector registers, where the elements have the same size and type in all input and output registers. We refer to each corresponding set of elements as a lane. When data reformatting instructions are introduced by the compiler, computations that were carried out in one lane may now be carried out in a different lane. This can often cause confusion to a programmer using a debugger to examine the contents of vector registers. Due to reformatting instructions added by the compiler, data may not appear where the programmer expects it to be. As a result, a debugger is needed that can display vector registers to a programmer in a manner that the programmer will understand what reformatting instructions have been added by the compiler, thereby allowing the programmer to understand how to debug the computer program. The disclosure and claims herein provide such a debugger, along with a compiler that generates a debug table used by the debugger.

Because the reformatting instructions are generated by the compiler, we need a way for the compiler to communicate information regarding what reformatting was done. In the particular implementation disclosed herein, this is done through the debug table 129 shown in FIG. 1. The compiler 125 generates the debug table 129, which includes information regarding reformatting that was done by the compiler for vector operations. This is shown as step 2510 in FIG. 25. Once the debug table is generated by the compiler in step 2510, a debugger can use the debug table to properly display data stored in a vector register to a user.

Figure 26:
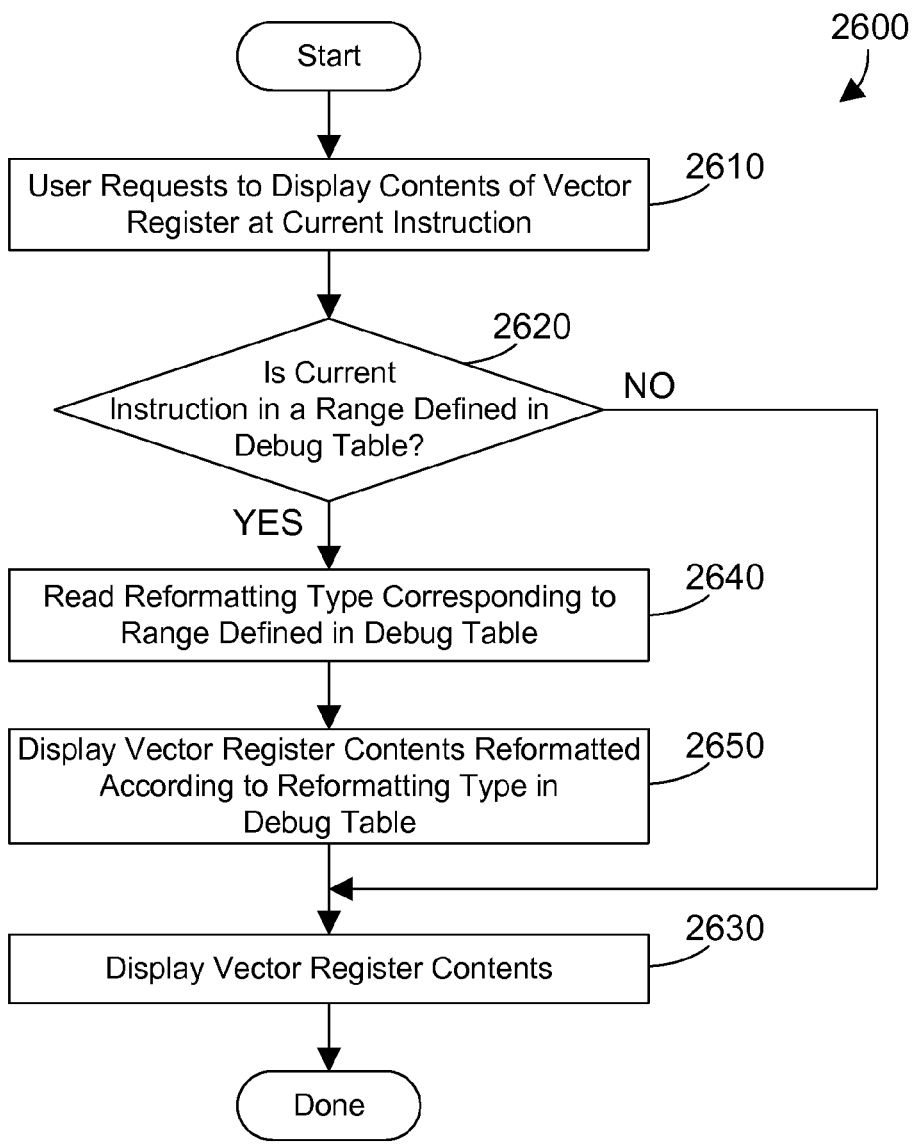
FIG. 26 is a flow diagram of a method for a debugger to display contents of a vector register.

Referring to FIG. 26, a method 2600 is preferably performed by a debugger, such as debugger 131 in FIG. 1. Method 2600 begins with a user requesting to display contents of a vector register at the current instruction (step 2610). The debugger checks to see if the current instruction is in a range of instructions defined in the debug table (step 2620). When the current instruction is not in a range of instructions defined in the debug table (step 2620=NO), the vector register contents are displayed normally (step 2630). When the current instruction is in a range of instructions defined in the debug table (step 2620=YES), the reformatting type is read from the defined range in the debug table (step 2640). The vector register contents are then reformatted according to the reformatting type in the debug table and displayed (step 2650). The vector register contents are also displayed normally (step 2630). Method 2600 thus provides a single display of vector register contents when the current instruction is not in a range defined in the debug table, and a dual display of vector register contents when the current instruction is in a range defined in the debug table, one displayed normally, and another displayed reformatted to counteract the reformatting applied by the compiler. In this manner the programmer sees both representations of data in the vector register, both the way the data is actually stored, as well as the way the data is conceptually stored according to the reformatting instructions inserted by the compiler.

Figure 25:
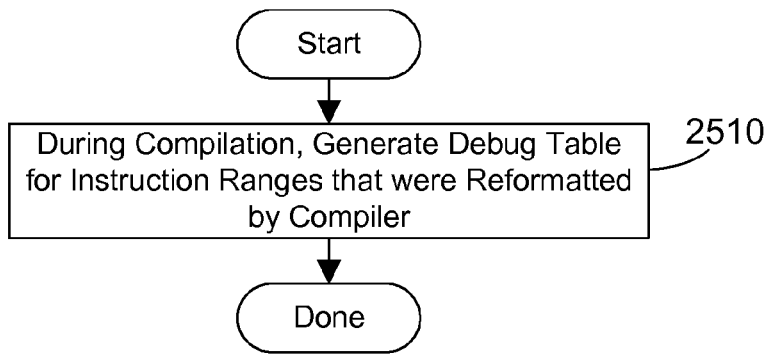
FIG. 25 is a flow diagram of a method for a compiler to generate a debug table during compilation of a computer program.
Figure 27:
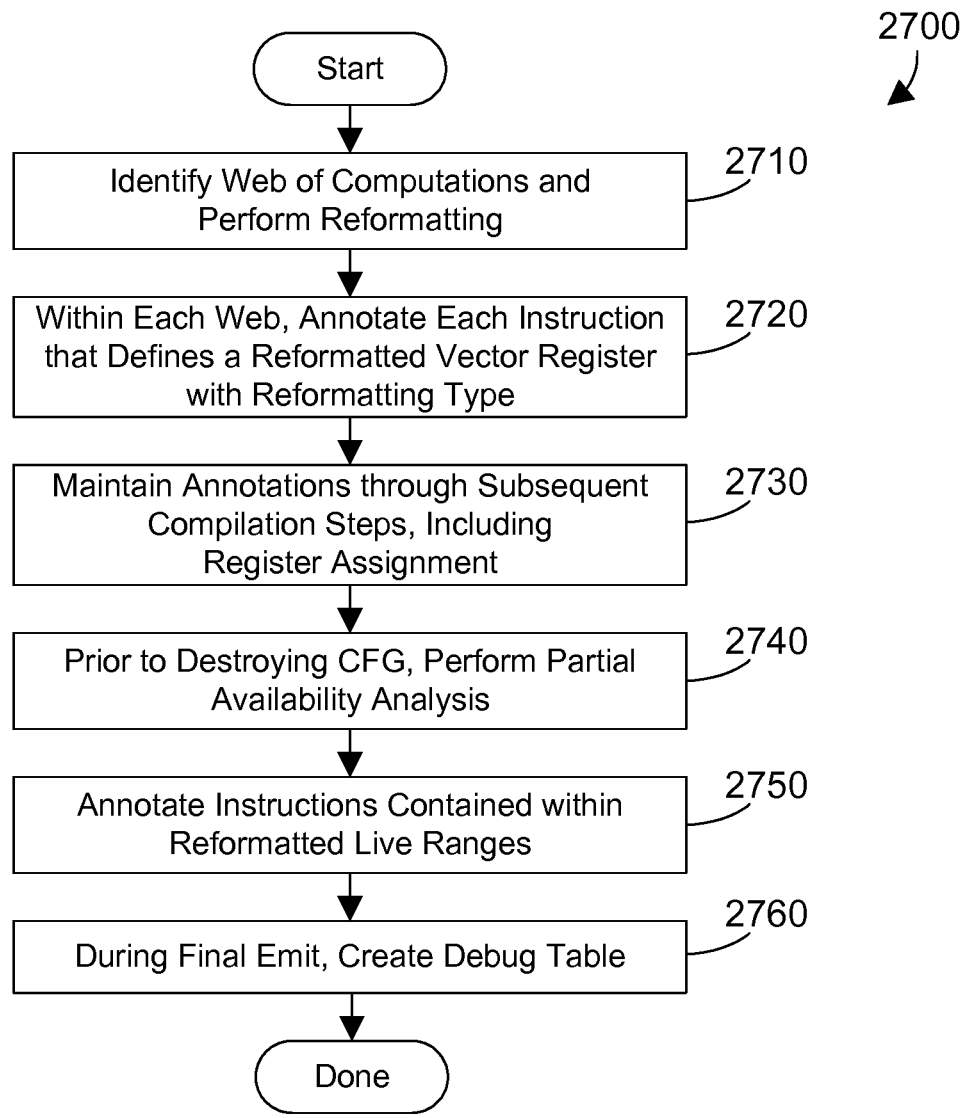
FIG. 27 is a flow diagram of a method for a compiler to generate a debug table.

Referring to FIG. 27, method 2700 represents one suitable implementation for step 2510 in FIG. 25. Webs of computations are identified and reformatting is performed as needed (step 2710). That is, webs of vector computations that fulfill the necessary conditions for swap removal are determined, and swap instructions are removed from those webs. As a result, each such web is now reformatted: Every definition of a vector register within an optimized web has been reformatted using the "swap" pattern that reverses the order of doublewords in the register from the expected norm. Within each web, each instruction that defines a reformatted vector register is annotated with a reformatting type (step 2720), which indicates the vector register has been reformatted using the swap pattern. Note that the swap optimization algorithm occurs prior to register assignment, so we are annotating "symbolic" registers that will later be assigned to "hard" or "physical" registers. The compiler then processes the rest of the compilation normally, up to the last point in compilation where the control flow graph (CFG) is still maintained. During this time, the reformatting annotations added in step 2720 must be maintained and updated according to any optimizations that are performed (step 2730). Note that when compiling for subsequent debug use, optimizations are typically constrained, so this is not too onerous. However, it is still possible to have simple changes, such as replacing two computations of the same value by a single computation, rearranging instructions to better utilize the processor resources, and so forth. During register assignment, a single live range (collection of interconnected definitions and uses) of a symbolic register may be split into two or more live ranges. During such optimizations, the annotations must be updated so that the correct symbolic register names are marked as swapped.

The reformatting type can take many forms, but its purpose is to identify the reformatting that was performed and/or a method for reversing that reformatting. Preferentially, the reformatting type includes a pattern for permuting the contents of the associated vector register to reverse the reformatting. For example, on the Power architecture, this might take the form of the permute control vector associated with a vperm instruction, which identifies the order in which bits should be rearranged. Alternatively, the reformatting type might contain one or more instructions that can be performed upon the specified vector register within the instruction range in order to reformat the vector register to the element order expected by the programmer. These instructions may refer to unspecified registers for intermediate or final results. For example, suppose that we want to represent that vector register 3 needs to have its low and high halves swapped. This can be represented with something like "xxpermdi % A, 3, 3, 2" to indicate that the result register % A can be arbitrarily assigned by the debugger when applying the instruction. Note that rather than explicitly identifying an instruction or instruction sequence, a simple encoding of common instructions and instruction sequences would be possible, and likely preferred.

Prior to destroying the CFG, a partial availability analysis is performed (step 2740). Partial availability analysis is an industry standard practice in compilers, and its mechanics are not further described here. However, this analysis in step 2740 provides us with the following information. Each basic block B in the CFG will have an IN[B] vector that lists which vector registers are defined along at least one path prior to the block being executed; that is, if V is an element of IN[B], then there is a definition D of V that can be reached from the beginning of the function, and there is a path from D to the beginning of block B. Note that D need not dominate B; B may be entered along some other path before D is executed the first time. We make one change to partial availability analysis, restricting its results to availability from definitions that are annotated as reformatting V. The compiler uses the information from partial availability analysis to annotate all instructions that reside within a live range for at least one reformatted vector register (step 2750). Further details of this step are discussed below with reference to FIG. 28. The compilation then proceeds to termination. During the final pass where instructions are written to the output object file, the compiler creates a new debug table containing reformatting information (step 2760). Further details of this step are discussed below with reference to FIG. 29.

Figure 28:
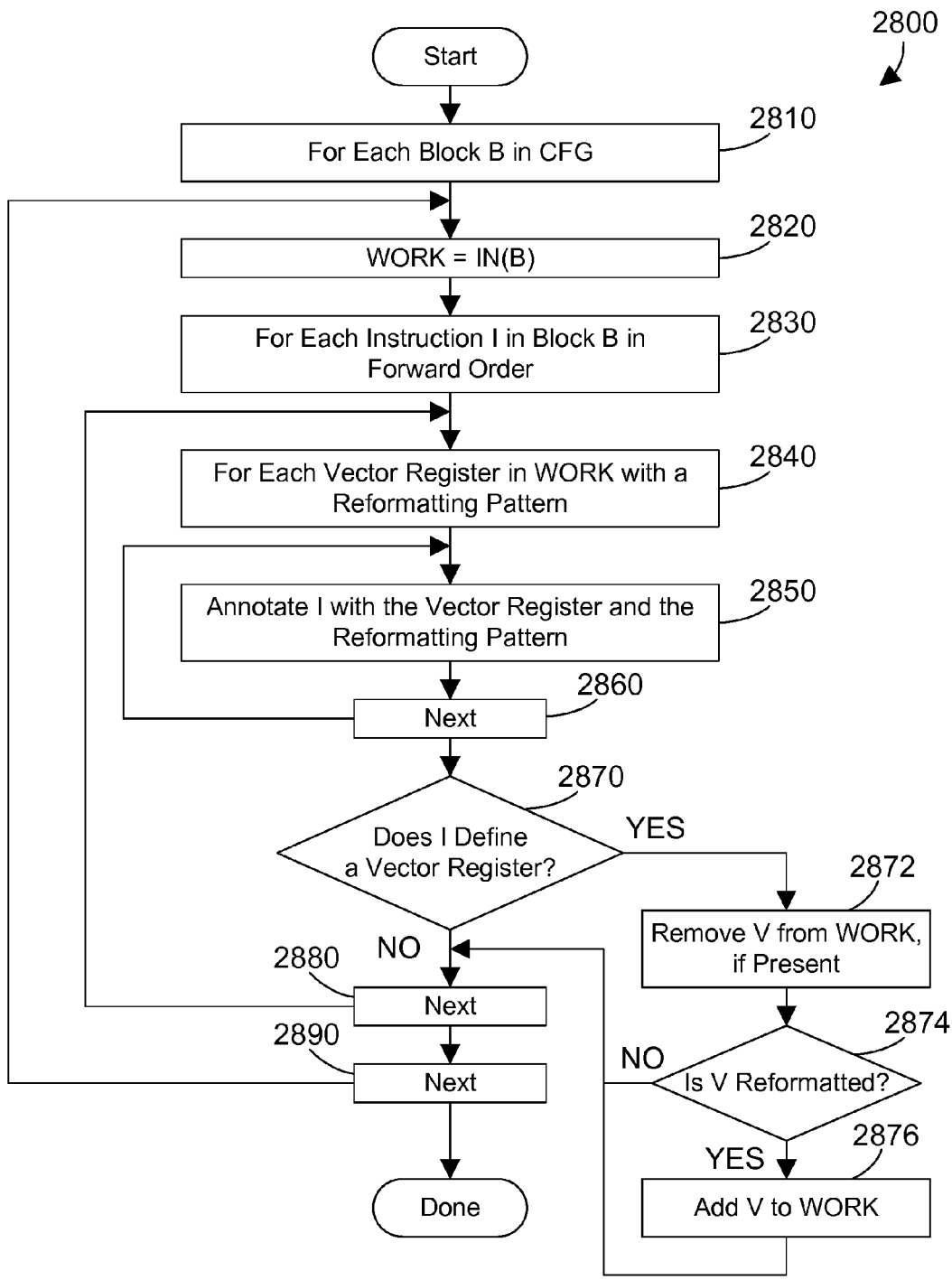
FIG. 28 is a flow diagram of a method for annotating instructions in the computer program that are in an address range corresponding to a vector reformatting operation.

Referring to FIG. 28, method 2800 is one suitable implementation for step 2750 shown in FIG. 27. Each block B in the CFG is processed in turn (step 2810). Initially we set the variable WORK to the set of vector registers in IN[B] (step 2820). Then we process each instruction I in the block, from first to last (step 2830). In steps 2840, 2850 and 2860, instruction I is annotated with every vector register in WORK (recall that we restricted availability analysis to operate only on definitions representing a reformatted value). Then, if I is not an instruction that defines a vector register (step 2870=NO), proceed to the next instruction (step 2880). If I is an instruction that defines a vector register (step 2870=YES), if V is an element of WORK, remove it from WORK (step 2872). If instruction I has been annotated as reformatting V with the swap pattern (step 2874=YES), add V to the set WORK (step 2876) and proceed to the next instruction (step 2880). If I is not so annotated (step 2874=NO), just proceed to the next instruction (step 2880). After all instructions in B have been processed, proceed to the next basic block (step 2890). When all basic blocks have been processed, the annotation process of method 2800 is complete.

Figure 29:
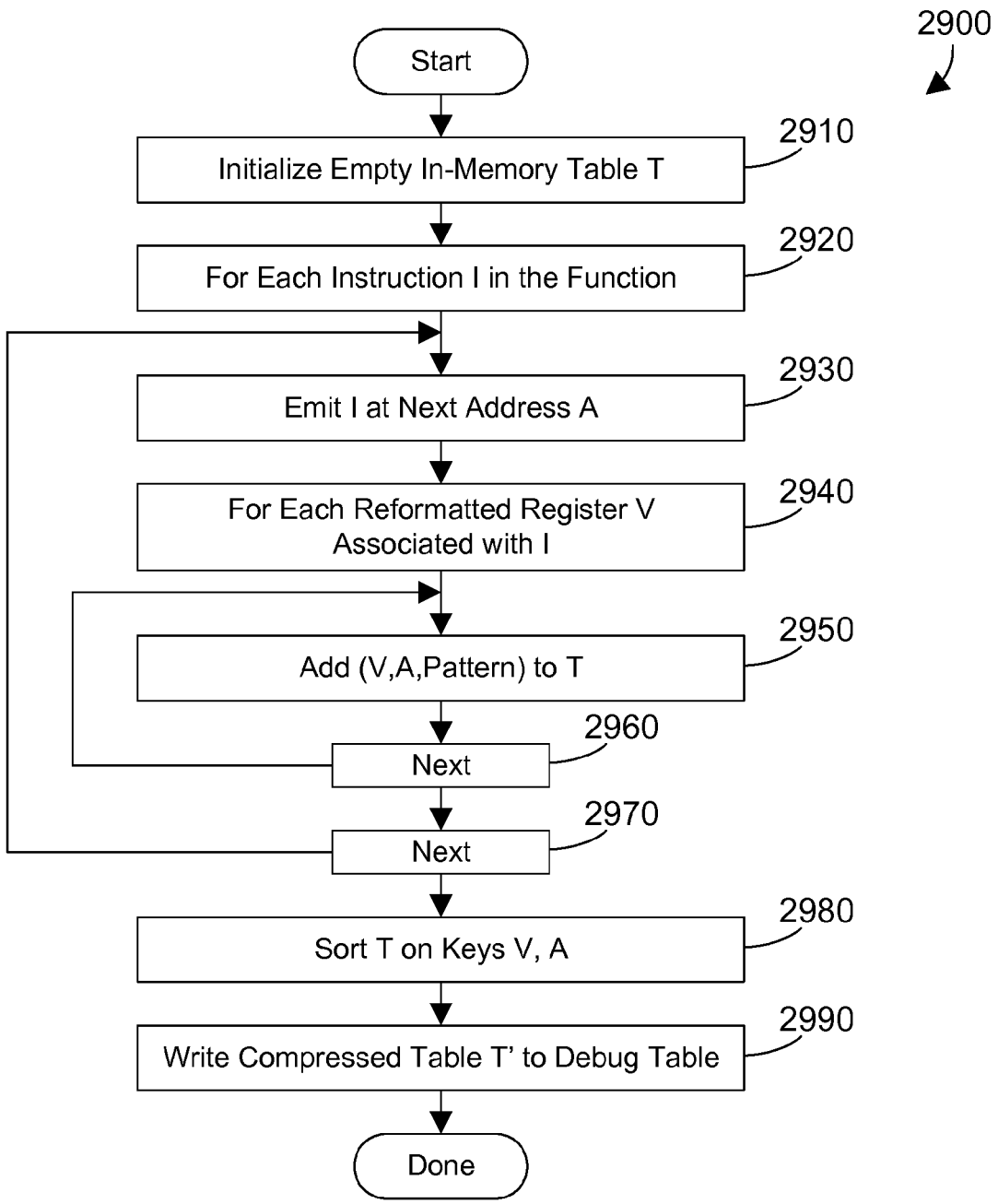
FIG. 29 is a flow diagram of a method for generating a debug table.

Referring to FIG. 29, method 2900 is one suitable implementation for step 2760 in FIG. 27 for creating the debug table. An in-memory empty table T is initialized to an empty state (step 2910). For each instruction I in the current function being compiled (step 2920), the compiler performs all the normal actions associated with emitting the instruction to an object file at the next available address A (step 2930). The annotations added in step 2750 in FIG. 27 are then considered, and each register V in the annotations for I is processed individually (step 2940). The compiler adds a record consisting of the triple (V, A, pattern) to the in-memory table T (step 2950). Note that for this specific example presented herein the reformatting type will always be a swap. After all annotated registers have been processed for I (step 2960), and after all instructions I have been processed (step 2970), the compiler then sorts table T using the vector register as the primary key and the instruction address as the secondary key (step 2980). This allows recognition of contiguous address ranges for the same vector register. Thus a compressed table T' using address ranges can then be written to the debug table (step 2990). The debug table T' produced in step 2990 is most preferably the debug table 129 shown in FIG. 1. Note that the addresses in the debug table must be relocated in the same manner as addresses in the program code whenever the code is linked or loaded.

Figure 30:
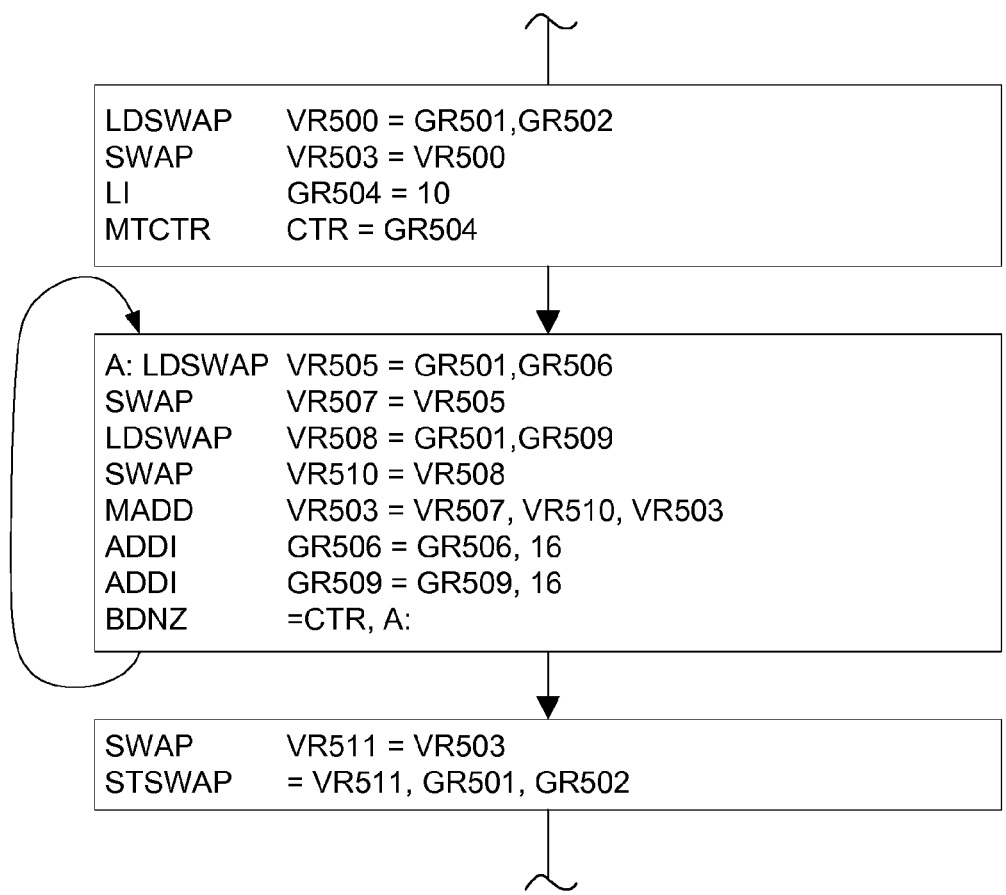

An example is now presented in FIGS. 30-39 to illustrate generation of the debug table 129 for a sample portion of a control flow graph (CFG) that includes the intermediate code shown in FIG. 30. The code loads a single vector value from memory, and then repeatedly loads two more vector values from memory which are multiplied and accumulated with the original value. The final result is stored to the same location where the first value originated.

Figure 31:
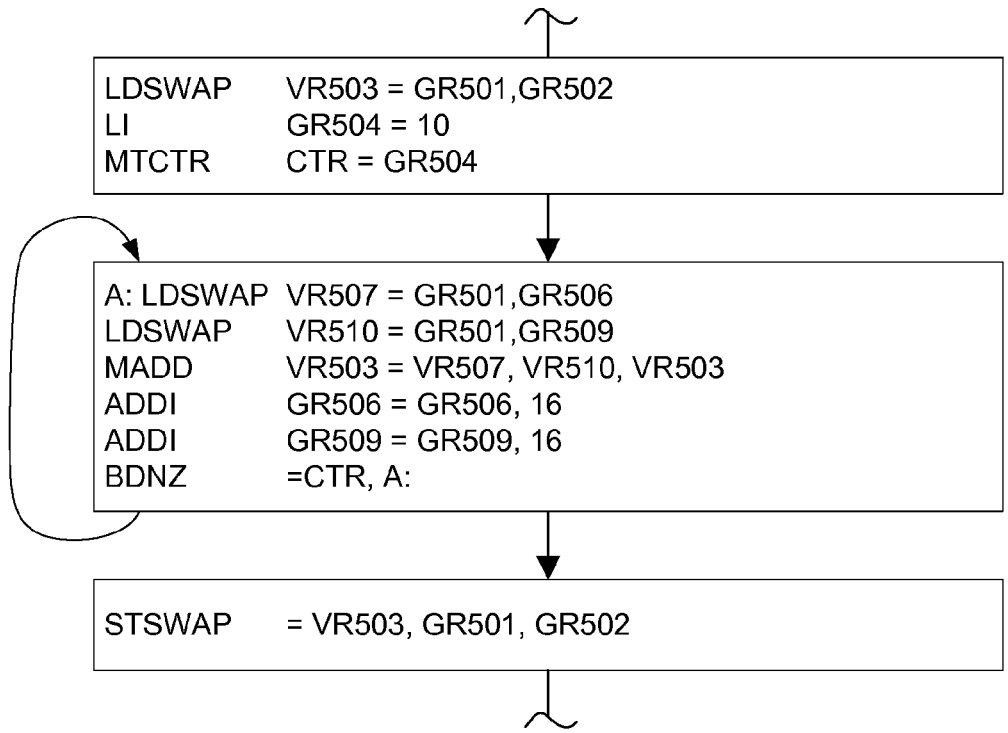
Figure 32:
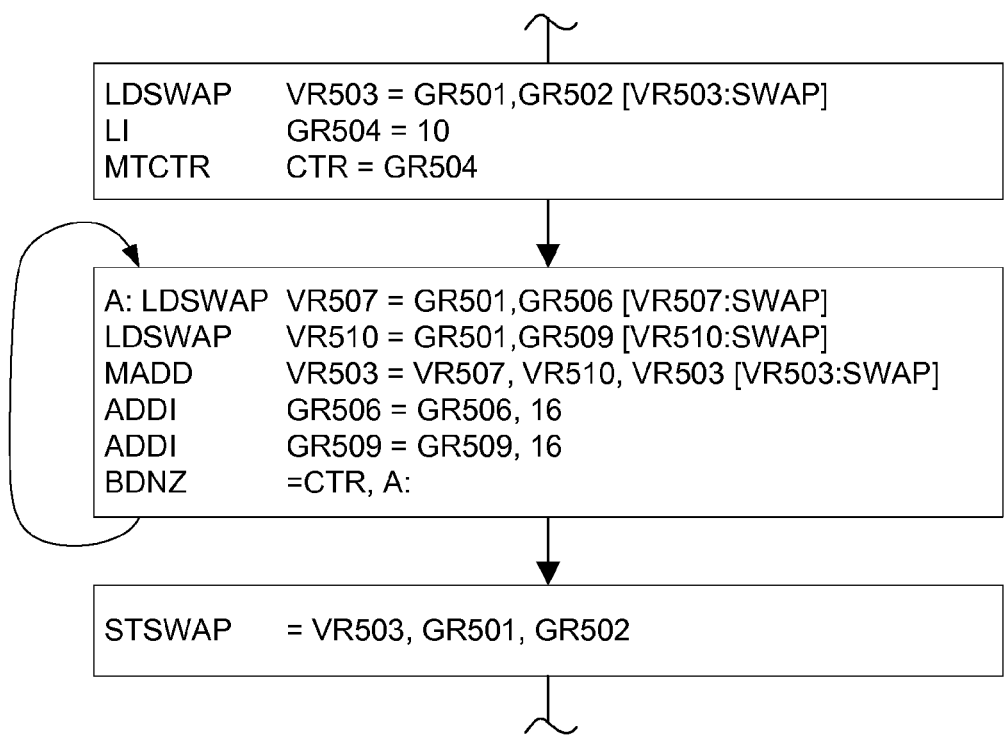
Figure 33:
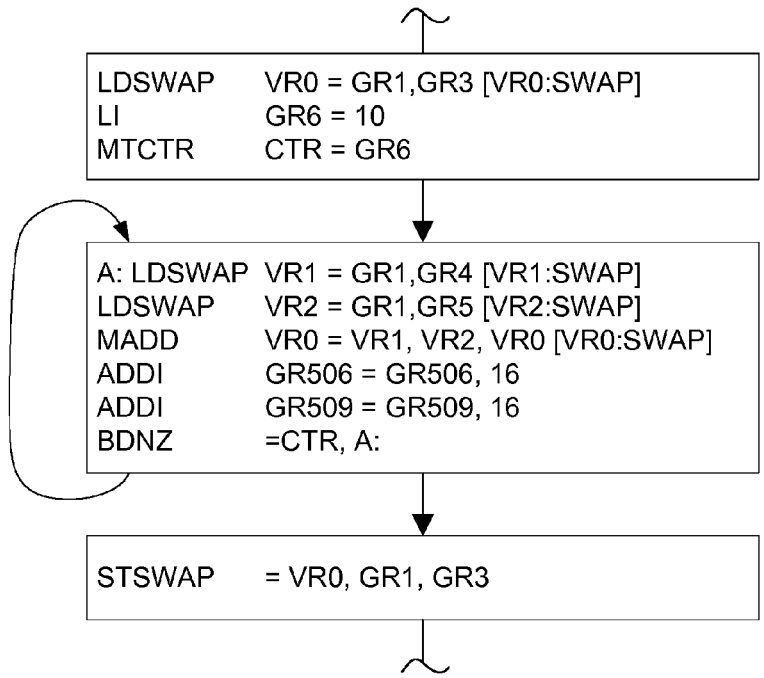

The code in FIG. 30 uses pseudo-ops to represent that this is intermediate code. These pseudo-ops represent operations available on POWER8 computer systems, and the corresponding operations are eventually exposed in FIG. 36. Pseudo-ops have the following meaning:

LDSWAP: Load a vector register and swap the two doublewords
SWAP: Swap the two doublewords in a vector register
LI: Load an immediate value into a general-purpose register
MTCTR: Move an integer value into the count register used for loops
MADD: Multiply two vectors and add a third vector to the result
BDNZ: If the count register has a nonzero value, decrement it and branch to the given address
ADDI: Add an immediate value to a value in a general-purpose register
STSWAP: Swap the two doublewords in a vector register and store the result FIG. 31 shows the result of performing swap removal on the code in FIG. 30, resulting in smaller, simpler code. FIG. 32 shows the same code annotated with virtual registers that are defined with a reformatted (swapped) value by the corresponding instructions. In FIGS. 30-32, symbolic register numbers are used for vector registers (e.g., VR501) and for general-purpose (integer/address) registers (e.g., GR501). FIG. 33 shows the code from FIG. 32 after one possible register assignment using register numbers available in the hardware. Note that both the intermediate code and the annotations have been updated to reflect the register assignment.

Figure 34:
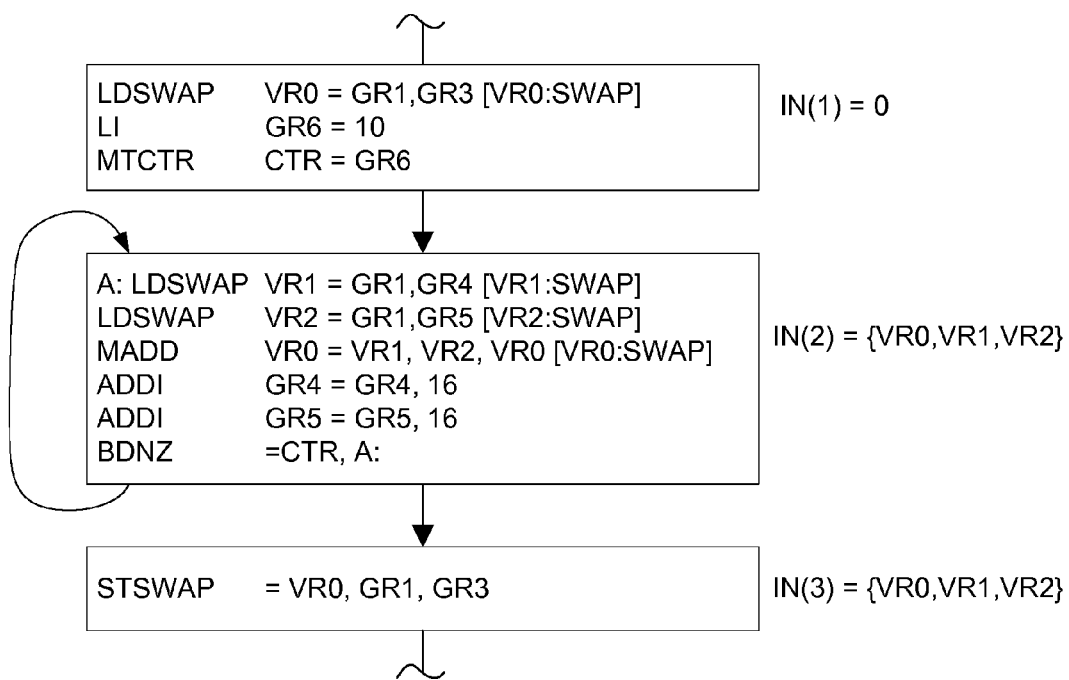

FIG. 34 shows some of the information provided by performing partial availability analysis on the code in FIG. 33. The partially available reformatted vector registers on entry to each block are: none for block 1; VR0, VR1, and VR2 for block 2; and VR0, VR1, and VR2 for block 3. VR1 and VR2 are partially available at the beginning of block 2 because they are defined in block 2, and there is a path from block 2 back to itself.

Each block is then processed, setting the WORK set to IN[B] for each block and walking through its instructions as described in method 2800 in FIG. 28. Note that the set of partially available reformatted vector registers annotated on an instruction indicates the registers that are live before the instruction is executed; therefore they do not include the registers defined by that instruction. The results are shown in FIG. 35. The idea of these sets is that if a debugger stops prior to executing an instruction I, then is asked to output a register value in the annotated list for I, the debugger must account for the reformatting when displaying the register's value.

In step 2760 in FIG. 27, the code is output by the compiler and the debug table is created. FIG. 36 shows an assembly dump of the code emitted from step 2760. The hexadecimal value on the left is the address chosen for each instruction in the object file, which, as previously noted, may later be relocated during linking and loading. The pseudo-ops are replaced by real POWER8 instructions. During the creation of the code, the annotated registers are associated with registers and written to the in-memory table T, as shown in FIG. 37. This table is then sorted on vector register and address, as shown in FIG. 38. Note that this makes it simple to compress the records associated with each register into address ranges when consecutive instructions have the same register annotated. The result of compressing table T shown in FIG. 38 into the final table T' is shown in debug table 129 in FIG. 39. Note the debug table 129 preferably includes a plurality of entries, each entry including: a vector register; a start address; an end address; and a reformatting type, as shown in FIG. 39.

While a swap is shown as the reformatting type in the examples in FIGS. 30-39, there are other reformatting types that could be specified, including: reversing all bytes, reversing all halfwords, reversing all words, reversing all double words, reversing all quarter-vectors (i.e., portions corresponding to ¼ of the total length), reversing half-vectors, and so forth. In yet other embodiments, such reformatting operations may include exchanging even and odd bytes, half-words, words, double words, quarter-vectors, half-vectors and so forth. In yet another embodiment, reformatting types correspond to any and all combinations of any of these patterns, or, more generally, any permutation of any byte to another byte position, as specified by a permute vector, e.g., as used in conjunction with the known vperm of vector shuffle operations, by specifying such patterns. In yet another embodiment, the reformatting may be specified by a named vector register. In yet another embodiment, the reformatting may correspond to yet another reformatting method. In yet another embodiment, the reformatting type may be inferred by the compiler when the compiler only handles one reformatting type, which means the reformatting type would not need to be included in the debug table. The disclosure and claims herein extend to any suitable type of reformatting a compiler could do with respect to vector operations, whether currently known or developed in the future.

With the debug table 129 shown in FIG. 39, we assume a user, such as a programmer, is debugging this code, and sets a breakpoint at instruction 0x00001008, which is the address for the MTCTR instruction. When the breakpoint is reached, the user then asks to display the contents of vector register VR0. The debugger looks up the combination of VR0 and address 0x00001008 in table 129 in FIG. 39. Because the address of the current instruction is 0x00001008, which is between 0x00001004 and 0x00001024, a matching record in the debug table 129 is found. The debugger then displays the contents of VR0 both normally and as if the swap reformatting had not taken place. Then the user asks to display the contents of vector register VR2. The debugger looks up the combination of VR2 and address 0x00001008 in debug table 129 of FIG. 39. Because the address of the current instruction is 0x00001008, which is not between 0x0000100c and 0x00001024, there is not a matching record. Therefore the debugger displays the contents of VR2 normally, and does not display it as if the swap reformatting had not taken place. The example here shows how a debugger can use the debug table to display the contents of a vector register normally when the vector register has not been reformatted by the compiler, and can display the contents of the vector register both normally and as reformatted when the vector register has been reformatted by the compiler. Displaying the vector register in both forms gives the user sufficient information to enable the user to effectively debug the computer program without getting confused by the reformatting instructions added by the compiler, which affect where data is stored within a vector register.

An alternate embodiment could calculate full availability analysis as well as partial availability analysis. A register V is fully available at a point of execution if EVERY path from the beginning of the function to that point must encounter a definition of V. Note that in the previous example, if we stop at address 0x0000100c and inquire about register VR0, every path to that point encounters a definition of VR0, and furthermore all of those definitions reformat VR0. Thus we can say with certainty that VR0 has been swapped, and we can make a stronger statement to the user of the debugger reflecting this. However, at that same address, VR1 is not fully available. The first time we reach block 2, VR1 has not been defined in the code that we can see (although it may be defined upstream). Thus we can only make a weaker statement that the register contents might be swapped, and in this case both views of the registers contents should be shown. With this alternate embodiment, computing both full and partial availability of reformatting definitions allows us to distinguish between must-be-reformatted and may-be-reformatted registers, and display them differently.

The preferred embodiment deals with a single class of reformatting, namely swaps. In another embodiment, we could track more than one kind of reformatting at a time. In such a case, partial availability analysis would indicate all possible reformattings that are partially available at a given point. The debugger would then display all possible reformattings for a register that might be reformatted, but (with a modified full availability analysis) could display only a single reformatting for a register that must be reformatted the same way along all paths.

In addition to the embodiments described above, it may be that a compiler may spill registers to temporary memory locations, and that these temporary memory locations should also have the reformatting reversed when displaying the memory address. The debug table described above may be modified to permit a memory location to be specified in an entry, rather than a vector register. The debugger can then use similar logic to properly display contents of such a memory location when requested by the user. Note that such temporary memory locations will typically be offsets relative to a stack pointer, frame pointer, or some other base pointer. The debug table 129 may alternatively contain single entries for each instruction at which point one or more vector registers have been reformatted. Each entry would contain a set of these vector registers, and the reformatting description that applies to each register.

While the specific examples in the figures and discussed above show a single debug table, one skilled in the art will understand that a debug table could be a virtual table that includes a plurality of tables, where each column, or pairs of columns, are stored in another distinct table, the tables being structures to be combined in a programmatic fashion by a debugger to yield the elements shown in the debug table discussed above.

The claims and disclosure herein provide an optimizing compiler that includes a vector optimization mechanism that optimizes vector instructions by eliminating one or more vector element reverse operations. The compiler can generate code that includes multiple vector element reverse operations that are inserted by the compiler to account for a mismatch between the endian bias of the instruction and the endian preference indicated by the programmer or programming environment. The compiler then analyzes the code and reduces the number of vector element reverse operations to improve the run-time performance of the code. The compiler generates a debugger table that specifies which instructions have corresponding reformatting operations. A debugger then uses the debugger table to display contents of the vector register, which is displayed in regular form as well as in a form that is reformatted according to information in the debugger table.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a computer program residing in the memory, the computer program including a plurality of instructions that includes at least one vector instruction;
   a debug table that specifies a vector register, a corresponding address range for the specified vector register, and a corresponding endian reformatting type for the specified vector register; and
   a debugger residing in the memory and executed by the at least one processor, the debugger receiving a request to display contents of a vector register at a current instruction in the computer program, and in response, the debugger determines whether the current instruction has an address within an address range in the debug table, and when the current instruction is not within an address range in the debug table, the debugger displays the contents of the vector register, and when the current instruction has an address within an address range of the debug table, the debugger determines from the debug table an endian reformatting type corresponding to the address range, and displays the contents of the vector register and additionally displays the contents of the vector register after reformatting the contents according to the endian reformatting type.

2. The apparatus of claim 1 further comprising a compiler that generates the debug table during compilation of the computer program.

3. The apparatus of claim 2 wherein the compiler generates the debug table during compilation of the computer program by annotating instructions in the computer program that are in an address range corresponding to a vector reformatting operation.

4. The apparatus of claim 1 wherein the debug table comprises a plurality of entries, each entry including:
   a vector register;
   a start address;
   an end address; and
   an endian reformatting type.

5. The apparatus of claim 1 wherein the endian reformatting type comprises a swap.

6. The apparatus of claim 1 wherein the endian reformatting type includes at least one instruction to undo endian reformatting done by a compiler.

7. An apparatus comprising:
   at least one processor;
   a memory coupled to the at least one processor;
   a computer program residing in the memory, the computer program including a plurality of instructions that includes at least one vector instruction;
   a debug table that comprises a plurality of entries, each entry including:
      a vector register;
      a start address;
      an end address; and
      an endian reformatting type;
   a compiler that generates the debug table during compilation of the computer program by annotating instructions in the computer program that are in an address range corresponding to an endian vector reformatting operation; and
   a debugger residing in the memory and executed by the at least one processor, the debugger receiving a request to display contents of a vector register at a current instruction in the computer program, and in response, the debugger determines whether the current instruction has an address within an address range in the debug table, and when the current instruction is not within an address range in the debug table, the debugger displays the contents of the vector register, and when the current instruction has an address within an address range of the debug table, the debugger determines from the debug table an endian reformatting type corresponding to the address range, and displays the contents of the vector register and additionally displays the contents of the vector register after reformatting the contents according to the endian reformatting type.

8. The apparatus of claim 7 wherein the endian reformatting type comprises a swap.

9. The apparatus of claim 7 wherein the endian reformatting type includes at least one instruction to undo endian reformatting done by the compiler.

10. An article of manufacture comprising software stored on a computer readable storage medium, the software comprising:
   a debug table that specifies a vector register, a corresponding address range for the specified vector register, and a corresponding endian reformatting type for the specified vector register; and
   a debugger receiving a request to display contents of a vector register at a current instruction in a computer program that includes a plurality of instructions that includes at least one vector instruction, and in response, the debugger determines whether the current instruction has an address within an address range in the debug table, and when the current instruction is not within an address range in the debug table, the debugger displays the contents of the vector register, and when the current instruction has an address within an address range of the debug table, the debugger determines from the debug table an endian reformatting type corresponding to the address range, and displays the contents of the vector register and additionally displays the contents of the vector register after reformatting the contents according to the endian reformatting type.

11. The article of manufacture of claim 10 further comprising a compiler that generates the debug table during compilation of the computer program.

12. The article of manufacture of claim 11 wherein the compiler generates the debug table during compilation of the computer program by annotating instructions in the computer program that are in an address range corresponding to a vector reformatting operation.

13. The article of manufacture of claim 10 wherein the debug table comprises a plurality of entries, each entry including:
- a vector register;
- a start address;
- an end address; and
- an endian reformatting type.

14. The article of manufacture of claim 10 wherein the endian reformatting type comprises a swap.

15. The article of manufacture of claim 10 wherein the endian reformatting type includes at least one instruction to undo endian reformatting done by a compiler.

* * * * *